United States Patent
Sasaki et al.

(10) Patent No.: US 11,333,605 B2
(45) Date of Patent: May 17, 2022

(54) SAMPLE MEASUREMENT DEVICE AND SAMPLE MEASUREMENT METHOD

(71) Applicant: SYSMEX CORPORATION, Kobe (JP)

(72) Inventors: Kazuhiro Sasaki, Kobe (JP); Takeshi Yamamoto, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 0 days.

(21) Appl. No.: 16/786,200

(22) Filed: Feb. 10, 2020

(65) Prior Publication Data
US 2020/0271585 A1    Aug. 27, 2020

(30) Foreign Application Priority Data

Feb. 22, 2019 (JP) .............................. JP2019-031055

(51) Int. Cl.
*G01N 21/64* (2006.01)
*G01N 15/14* (2006.01)

(52) U.S. Cl.
CPC ..... *G01N 21/6456* (2013.01); *G01N 15/1436* (2013.01); *G01N 2021/6421* (2013.01); *G01N 2021/6478* (2013.01)

(58) Field of Classification Search
CPC ........... G01N 21/6456; G01N 15/1436; G01N 2021/6421; G01N 2021/6478; G01N 15/1459; G01N 2015/144; G01N 21/6486; G01N 21/01; G01J 3/36; G01J 3/14
See application file for complete search history.

(56) References Cited

U.S. PATENT DOCUMENTS

| | | |
|---|---|---|
| 5,786,915 A | 7/1998 | Scobey |
| 5,944,401 A | 8/1999 | Murakami et al. |
| 6,608,680 B2 | 8/2003 | Basiji et al. |
| 2008/0266564 A1* | 10/2008 | Themelis ................ G01J 3/51 356/419 |
| 2009/0274415 A1 | 11/2009 | Graham et al. |
| 2010/0215364 A1 | 8/2010 | Graham et al. |
| 2013/0100443 A1 | 4/2013 | Li et al. |

(Continued)

FOREIGN PATENT DOCUMENTS

| | | |
|---|---|---|
| WO | 01/53783 A1 | 7/2001 |
| WO | 2016/112576 A1 | 7/2016 |

OTHER PUBLICATIONS

Extended European search report dated Jun. 26, 2020 in a counterpart European patent application No. 20156585.0.

*Primary Examiner* — Marcus H Taningco
(74) *Attorney, Agent, or Firm* — Crowell & Moring LLP

(57) ABSTRACT

Disclosed is a sample measurement device including a light applicator configured to apply a light to a sample so as to generate light from a particle in the sample; an optical block in which a plurality of prisms are fixed, each of the plurality of prisms including a light entry surface which allows entry thereinto of the light generated from the particle in the sample, a reflection surface configured to selectively reflect a part of the light having entered the light entry surface, and a light outputting surface configured to output the light reflected by the reflection surface; and a light receiver configured to receive the light outputted from the light outputting surface of each of the plurality of prisms.

17 Claims, 17 Drawing Sheets

(56) References Cited

U.S. PATENT DOCUMENTS

| | | | |
|---|---|---|---|
| 2014/0030729 A1* | 1/2014 | Basiji | G01N 33/5091 |
| | | | 435/6.14 |
| 2017/0058343 A1* | 3/2017 | Quintel | G02B 26/0883 |
| 2017/0343475 A1 | 11/2017 | Yamada | |
| 2018/0246029 A1 | 8/2018 | Wu et al. | |
| 2019/0339202 A1 | 11/2019 | Yamada | |

* cited by examiner

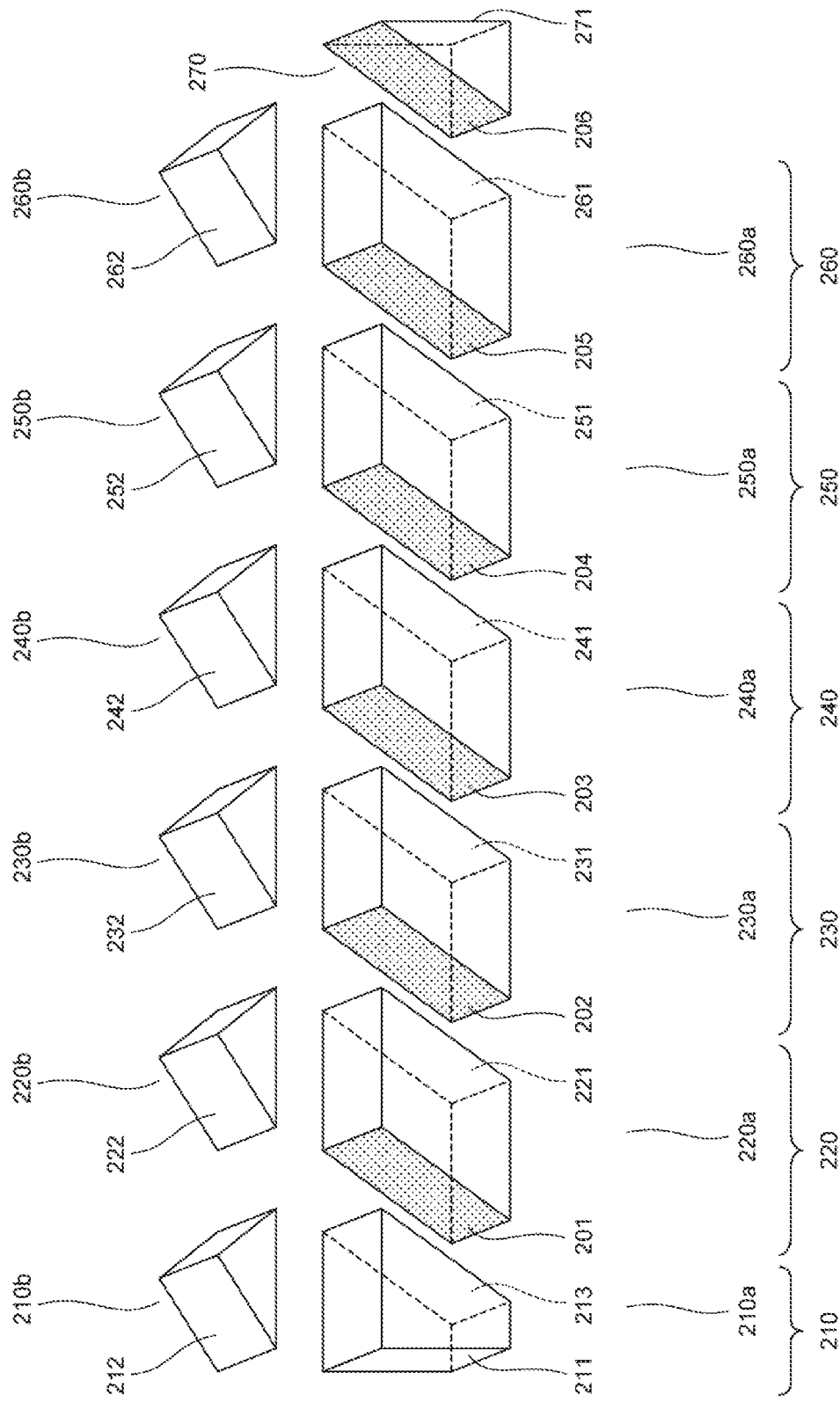
FIG. 6 MODIFICATION

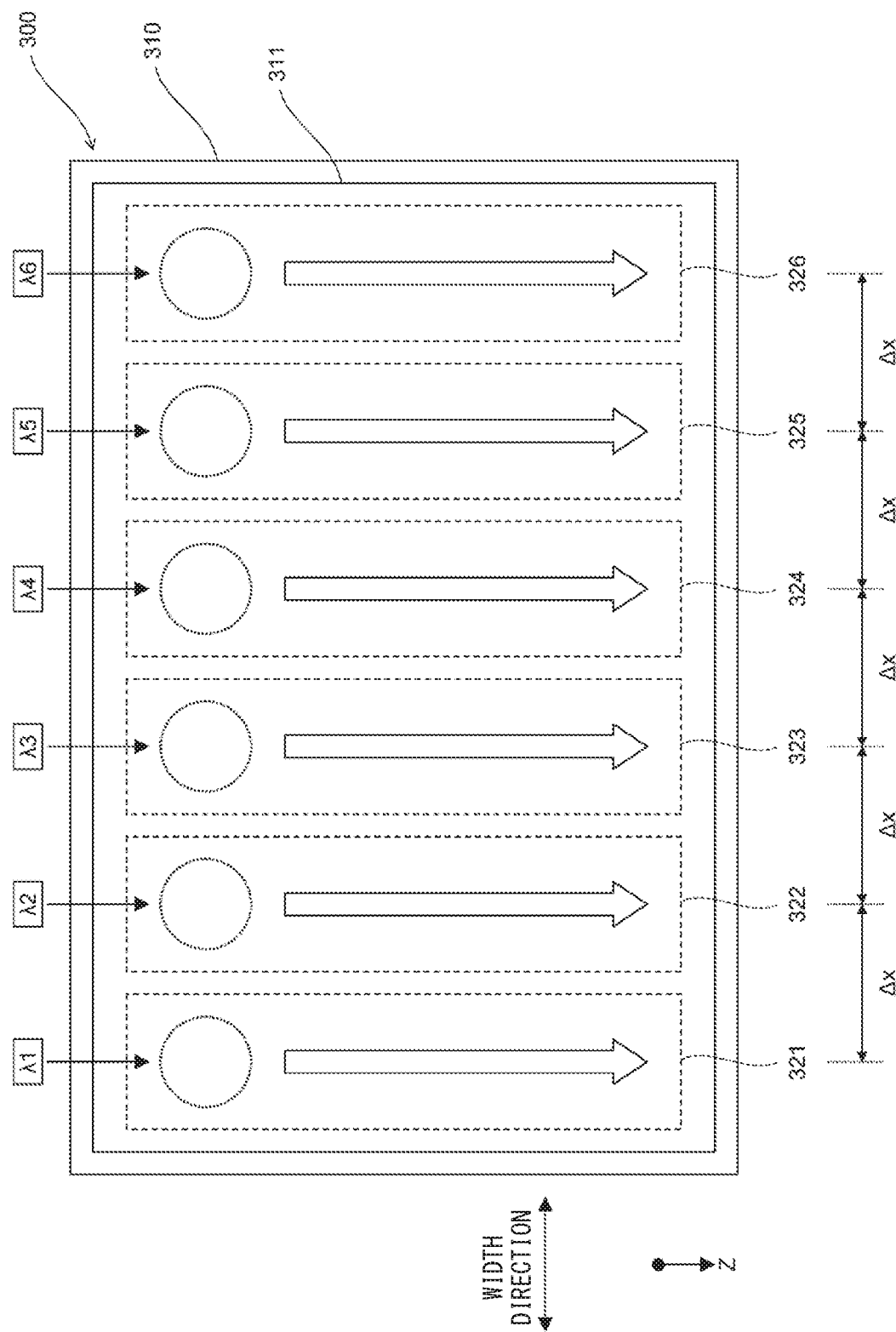

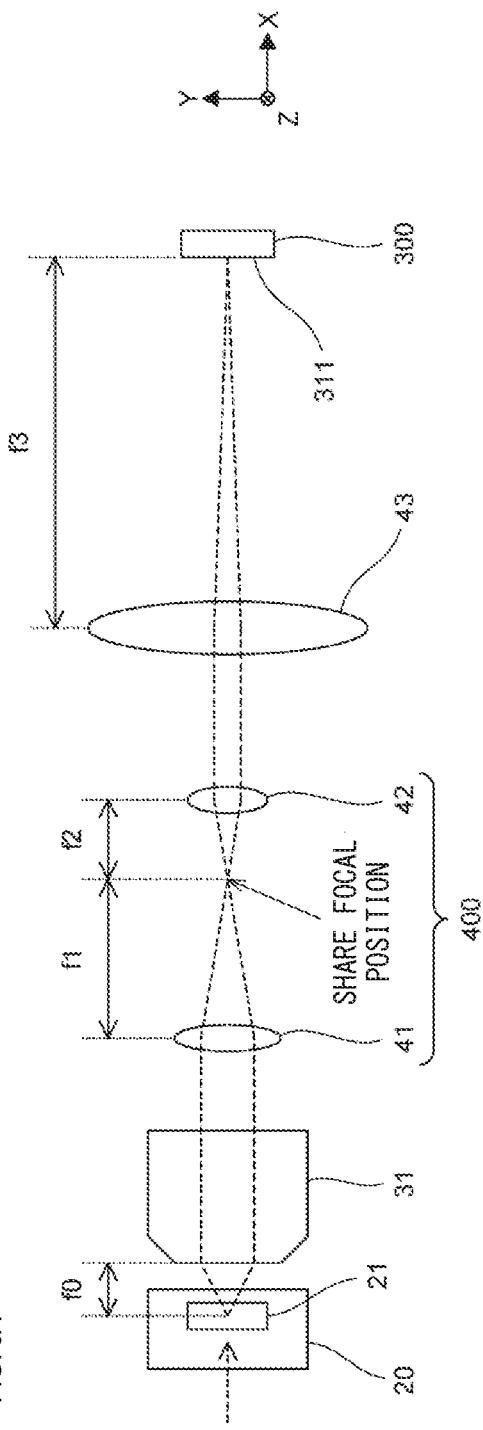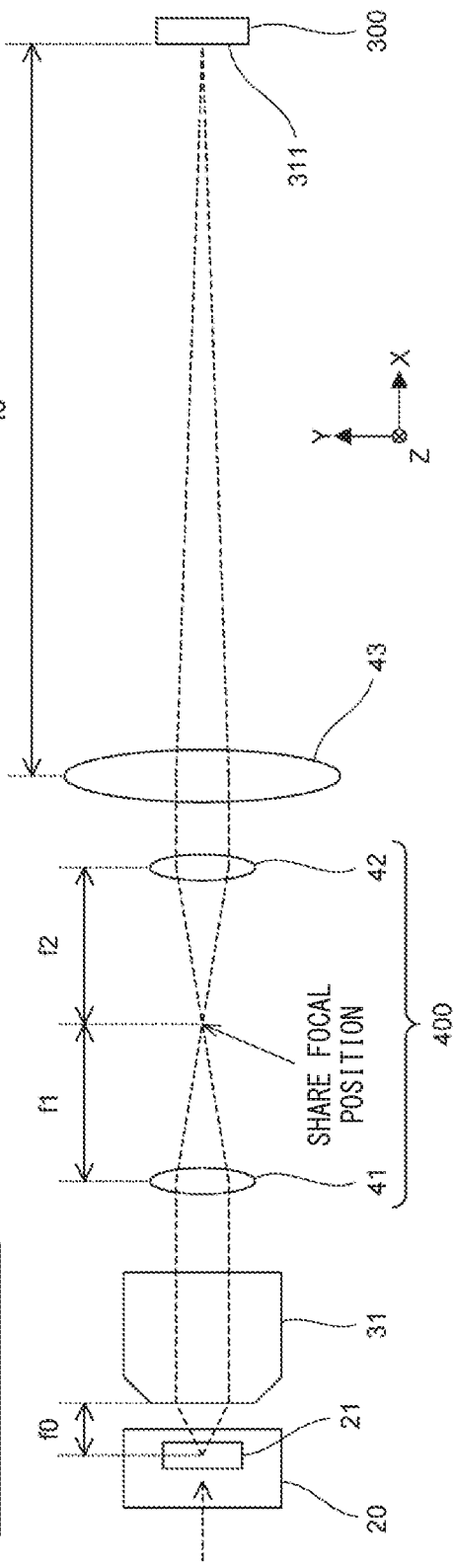

MODIFICATION

SAMPLE MEASUREMENT DEVICE AND SAMPLE MEASUREMENT METHOD

RELATED APPLICATIONS

This application claims priority to Japanese Patent Application No. 2019-031055 filed on Feb. 22, 2019, entitled "Sample Measurement Device and Sample Measurement Method," the entire content of which is incorporated herein by reference.

BACKGROUND OF THE INVENTION

1. Field of the Invention

The present invention relates to a sample measurement device and a sample measurement method for measuring a sample.

2. Description of the Related Art

Sample measurement devices for obtaining a fluorescence image of cells in a sample and measuring the sample have been known. A sample measurement device (fluorescence image analyzer 600) described in Japanese Laid-Open Patent Publication No. 2018-10018 includes an optical unit 610 having a configuration in which four dichroic mirrors are combined, as shown in FIG. 16. The four dichroic mirrors of the optical unit 610 reflect, at angles slightly different from one another, four types of lights generated from particles in a sample by application of light to the sample and having different wavelengths such that the four types of lights are separated on a light receiving surface of an image-taking unit 620, whereby a fluorescence image for each of the wavelengths is obtained.

For the above-described sample measurement device, positional adjustments such as optical-axis alignment are performed on the plurality of the dichroic mirrors at the time of assembly in production of the device and at the time of maintenance after shipment of the device such that the lights having the respective wavelengths and reflected by the plurality of the dichroic mirrors of the optical unit 610 are applied to desired positions on the light receiving surface of the image-taking unit 620.

As shown in FIG. 17, the above-described optical unit 610 includes, for example, four plates 611 holding the dichroic mirrors 611a. An operator rotates pins 611b provided to the plates 611, thereby adjusting the rotational positions of the dichroic mirrors 611a held by the plates 611. The four plates 611 independently hold the respective dichroic mirrors 611a, and thus the operator individually performs, on the four plates 611, the positional adjustments of the respective dichroic mirrors 611a.

SUMMARY OF THE INVENTION

The scope of the present invention is defined solely by the appended claims, and is not affected to any degree by the statements within this summary.

A first aspect of the present invention relates to a sample measurement device. With reference to FIG. 1, a sample measurement device (10) according to the present aspect includes: a light applicator (100) configured to apply a light to a sample so as to generate light from a particle in the sample; an optical block (200) in which a plurality of prisms (210, 220, 230, 240, 250, 260, 270) are fixed, each of the plurality of prisms including a light entry surface which allows entry thereinto of the light generated from the particle in the sample, a reflection surface (201 to 206) configured to selectively reflect a part of the light having entered the light entry surface, and a light outputting surface (212, 222, 232, 242, 252, 262) configured to output the light reflected by the reflection surface (201 to 206); and a light receiver (300) configured to receive the light outputted from the light outputting surface (212, 222, 232, 242, 252, 262) of each of the plurality of prisms (210, 220, 230, 240, 250, 260, 270).

The optical block (200) refers to an optical component that is formed of a translucent material substantially homogeneous partially or entirely and thus allows transmission therethrough of light, and that refracts light with use of the difference between the speed of the light when advancing inside the optical block (200) and the speed of the light when advancing through an external space. The prisms (210, 220, 230, 240, 250, 260, 270) composing the optical block (200) are formed of, for example, glass, resin, rock crystal, or the like.

In the sample measurement device (10) according to the present aspect, for example, a plurality of lights generated from the particle in the sample and having wavelengths different from one another are respectively reflected by the plurality of the reflection surfaces (201 to 206) provided to the optical block (200), and are each guided to the light receiver (300). Since the common optical block (200) is used for the lights having the plurality of wavelengths, there is no need to use individual dichroic mirrors or the like for respectively guiding the lights having the respective wavelengths to the light receiver (300). Since the optical block (200) in which the plurality of prisms (210, 220, 230, 240, 250, 260, 270) having the reflection surfaces (201 to 206) are fixed is provided, the angles formed between the respective reflection surfaces (201 to 206) can be fixed. Accordingly, in such an optical unit, it becomes unnecessary to individually make any adjustments such as optical-axis alignment for a plurality of optical components, for the plurality of wavelengths. Therefore, operational burden can be lessened at the time of assembly and at the time of maintenance of the sample measurement device.

In the sample measurement device (10) according to the present aspect, the optical block (200) may be obtained by the plurality of prisms (210, 220, 230, 240, 250, 260, 270) being joined together so as to be formed integrally with each other. The phrase "the plurality of prisms being formed integrally with each other" refers to a state in which light does not pass through the outside (air) of any of the prisms when passing through the plurality of the reflection surfaces (201 to 206) of the optical block (200). Since the plurality of prisms (210, 220, 230, 240, 250, 260, 270) are formed integrally with each other, the relationship in angle between the plurality of the reflection surfaces (201 to 206) of the optical block (200) does not change. In addition, since the plurality of prisms (210, 220, 230, 240, 250, 260, 270) are formed integrally with each other, none of the plurality of the reflection surfaces (201 to 206) are exposed to the outside (air). Accordingly, the optical axes of the respective lights reflected by the plurality of the reflection surfaces (201 to 206) can be inhibited from deviating from desired directions beyond expectation. Therefore, the lights that reach desired light receiving regions of the light receiver (300) can be inhibited from decreasing.

In the sample measurement device (10) according to the present aspect, the optical block (200) may allow transmission therethrough of the light generated from the particle in the sample, and the light receiver (300) may receive the light transmitted through the optical block (200).

In the sample measurement device (10) according to the present aspect, the reflection surfaces (201 to 206) of the plurality of prisms (210, 220, 230, 240, 250, 260, 270) may be arranged along an advancement direction of the light that enters the optical block (200).

In the sample measurement device (10) according to the present aspect, the reflection surfaces (201 to 206) of the plurality of prisms (210, 220, 230, 240, 250, 260, 270) may be tilted in a same direction with respect to an advancement direction of the light that enters the optical block (200). Accordingly, the lights reflected by the respective reflection surfaces (201 to 206) of the optical block (200) are directed to one direction side, and thus the lights having passed via the optical block (200) can be easily received by the single light receiver (300). Accordingly, the sample measurement device (10) can be configured in a simple manner as compared to the case where a plurality of the light receivers (300) are disposed.

In the sample measurement device (10) according to the present aspect, a reflection surface (201, 203, 205) belonging to a first group among the reflection surfaces (201 to 206) of the plurality of prisms (210, 220, 230, 240, 250, 260, 270) may be tilted in a first direction with respect to an advancement direction of the light that enters the optical block (200), and a reflection surface (202, 204, 206) belonging to a second group different from the first group among the reflection surfaces (201 to 206) of the plurality of prisms (210, 220, 230, 240, 250, 260, 270) may be tilted in a second direction different from the first direction, with respect to the advancement direction of the light that enters the optical block (200).

In the sample measurement device (10) according to the present aspect, the reflection surfaces (201 to 206) of the plurality of prisms (210, 220, 230, 240, 250, 260, 270) may be tilted at the same angle with respect to an advancement direction of the light that enters the optical block (200).

In the sample measurement device (10) according to the present aspect, the reflection surfaces (201 to 206) of the plurality of prisms (210, 220, 230, 240, 250, 260, 270) may be tilted at angles different from one another, with respect to an advancement direction of the light that enters the optical block (200).

In the sample measurement device (10) according to the present aspect, the light outputting surfaces (212, 222, 232, 242, 252, 262) of the plurality of prisms (210, 220, 230, 240, 250, 260, 270) may be configured to output lights having different wavelengths respectively toward corresponding light receiving regions (321 to 326). Accordingly, the lights having the respective wavelengths can be guided to the corresponding light receiving regions of the light receiver (300) through adjustment of the shapes of the plurality of the light outputting surfaces.

In this case, the light outputting surfaces (212, 222, 232, 242, 252, 262) of the plurality of prisms (210, 220, 230, 240, 250, 260, 270) may be tilted at different angles with respect to an advancement direction of the light that enters the optical block (200). Accordingly, the lights having the respective wavelengths can be guided to the corresponding light receiving regions of the light receiver (300) through adjustment of the angles of the plurality of the light outputting surfaces (212, 222, 232, 242, 252, 262).

In addition, the intervals between the reflection surfaces (201 to 206) of the plurality of prisms (210, 220, 230, 240, 250, 260, 270) may be set to have widths that each prevent a corresponding one of the lights reflected by the reflection surfaces (201 to 206) from entering any light outputting surface (212, 222, 232, 242, 252, 262) that is adjacent to a corresponding one of the light outputting surfaces (212, 222, 232, 242, 252, 262). Accordingly, the lights having the respective wavelengths can be inhibited from overlapping with one another in the light receiving regions of the light receiver (300). Accordingly, signals based on the lights having the respective wavelengths can be obtained with high accuracy.

In the sample measurement device (10) according to the present aspect, the prisms (210, 220, 230, 240, 250, 260, 270) may be formed of translucent glass or resin.

In the sample measurement device (10) according to the present aspect, the reflection surfaces (201 to 206) may be each configured to reflect a light having a predetermined wavelength and allow transmission therethrough of a light having a wavelength other than the predetermined wavelength.

In the sample measurement device (10) according to the present aspect, the light receiver (300) may be configured to receive, on a single light receiving surface (311) thereof, the lights reflected by the reflection surfaces (201 to 206) of the plurality of prisms (210, 220, 230, 240, 250, 260, 270).

In the sample measurement device (10) according to the present aspect, the light receiver may include a first light receiver (510) and a second light receiver (520). The first light receiver (510) may be configured to receive, on a first light receiving surface (511) thereof, a light reflected by a reflection surface (201, 203, 205) belonging to a first group among the reflection surfaces (201 to 206) of the plurality of prisms (210, 220, 230, 240, 250, 260, 270). The second light receiver (520) may be configured to receive, on a second light receiving surface (521) thereof which is different from the first light receiving surface (511), a light reflected by a reflection surface (202, 204, 206) belonging to a second group different from the first group among the reflection surfaces (201 to 206) of the plurality of prisms (210, 220, 230, 240, 250, 260, 270).

In the sample measurement device (10) according to the present aspect, the light receiver (300) may be a TDI camera or a CCD camera.

The sample measurement device (10) according to the present aspect may include a reduction optical system (400) configured to reduce and collimate a shape of the light generated from the particle in the sample to guide the light to the optical block (200). Accordingly, the size of the optical block (200) can be made small. Accordingly, the size of the entire sample measurement device (10) can be made small.

In this case, the reduction optical system (400) may include: a first lens (41) configured to condense the light generated from the particle in the sample; and a second lens (42) configured to convert the light condensed by the first lens (41) into the collimated light, and guide the collimated light to the optical block (200). Accordingly, if the focal distance of the first lens (41) is made longer than the focal distance of the second lens (42), an image on the light receiving surface of the light receiver (300) can be set to be large.

In this case, the first lens (41) and the second lens (42) may each be a convex lens.

In this case, the sample measurement device (10) according to the present aspect may include a diaphragm (32) disposed at a convergence position of the light condensed by the first lens (41) and configured to remove unnecessary light other than the light condensed by the first lens (41). Accordingly, unnecessary light can be removed.

The sample measurement device (10) according to the present aspect may include a third lens (43, 501, 502)

configured to converge, to the light receiver (300, 510, 520), each of the lights having the different wavelengths and reflected by the reflection surfaces (201 to 206) of the plurality of prisms (210, 220, 230, 240, 250, 260, 270). Accordingly, the focal distance of the third lens (43, 501, 502) can be set to be short with use of the reduction optical system (400) configured to reduce the beam size. Accordingly, the distance from the third lens (43, 501, 502) to the light receiver (300, 510, 520) can be made short, whereby the width of the sample measurement device (10) in the direction from the third lens to the light receiver can be made small.

The sample measurement device (10) according to the present aspect may include an objective lens (31) configured to collect the light generated from the particle in the sample to which the application light has been applied.

In the sample measurement device (10) according to the present aspect, the light receiver (300, 510, 520) may be configured to take a bright field image and a fluorescence image of the particle, in respective different light receiving regions (321 to 326, 531 to 536) of the light receiver.

In this case, a reflection surface (206) that is disposed at an end among the reflection surfaces (201 to 206) of the plurality of prisms (210, 220, 230, 240, 250, 260, 270) may be configured to reflect a light for the bright field image.

The sample measurement device (10) according to the present aspect may include a filter (33, 34) configured to block a light included in the application light and having a predetermined wavelength. If the light included in the application light and having the predetermined wavelength enters the light receiving surface, of the light receiver (300), which allows entry thereinto of the lights generated from the sample and having the respective wavelengths, this light becomes stray light, resulting in reduction in the measurement accuracy of the lights generated from the particle. On the other hand, if the filter configured to block the light included in the application light and having the predetermined wavelength is disposed, occurrence of stray light guided to the light receiving surface can be inhibited.

In this case, the light receiver (300) may be configured to take a bright field image and a fluorescence image of the particle, in respective different light receiving regions (321 to 326, 531 to 536) of the light receiver, and the filter (34) may be disposed between the optical block (200) and the light receiver (300, 520) and configured to block a light for the bright field image, at a position through which a light for the fluorescence image passes.

The sample measurement device (10) according to the present aspect may include a flow cell (20) through which the sample is caused to flow, and the light applicator (100) may be configured to apply the application light to the sample flowing through the flow cell (20).

In the sample measurement device (10) according to the present aspect, the particle may be cell, and the light receiver (300) may be configured to receive fluorescences having a plurality of wavelengths different from one another from the cell to which the light has been applied. Accordingly, the cell can be analyzed in detail on the basis of the fluorescences having the plurality of wavelengths.

A second aspect of the present invention relates to a sample measurement method. The sample measurement method according to the present aspect includes: applying a light to a sample; causing light generated from a particle in the sample to enter an optical block (200) in which a plurality of prisms (210, 220, 230, 240, 250, 260, 270) are fixed, each of the plurality of prisms including a light entry surface which allows entry thereinto of the light generated from the particle in the sample, a reflection surface (201 to 206) configured to selectively reflect a part of the light having entered the light entry surface, and a light outputting surface (212, 222, 232, 242, 252, 262) configured to output the light reflected by the reflection surface (201 to 206); and guiding the light outputted from the light outputting surface (212, 222, 232, 242, 252, 262) of each of the plurality of prisms (210, 220, 230, 240, 250, 260, 270) to a light receiving region (321 to 326, 531 to 536).

In the sample measurement method according to the present aspect, the same advantageous effects as those in the first aspect are exhibited.

BRIEF DESCRIPTION OF THE DRAWINGS

FIG. 6 is a perspective view schematically showing prisms according to a modification of Embodiment 1 before assembly;

FIG. 7 is a schematic diagram showing a configuration of a light receiver according to Embodiment 1;

FIG. 8A is a schematic diagram for describing a reduction optical system and the total magnification of the entire optical system of a measurement unit, according to Embodiment 1;

FIG. 8B is a schematic diagram for describing a reduction optical system and the total magnification of the entire optical system of a measurement unit, according to a comparative example;

DETAILED DESCRIPTION OF THE PREFERRED EMBODIMENTS

Embodiment 1

Figure 1:
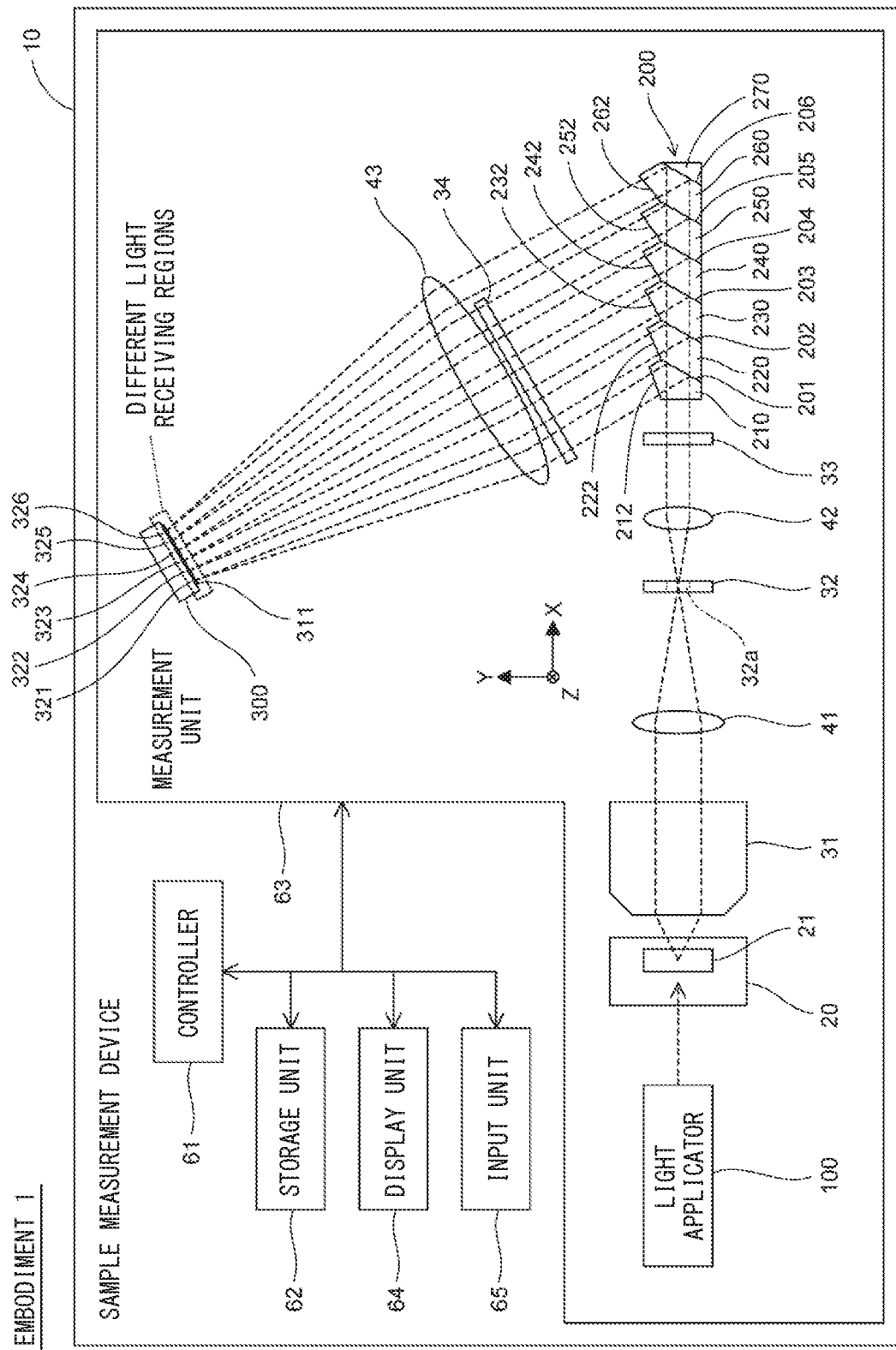
FIG. 1 is a schematic diagram showing a configuration of a sample measurement device according to Embodiment 1.

FIG. 1 is a schematic diagram showing a configuration of a sample measurement device 10. In FIG. 1, the XYZ axes are orthogonal to one another, the X-axis direction and the Y-axis direction are directions parallel to a horizontal plane, and the Z-axis positive direction is the vertically downward direction. The XYZ axes in the other drawings are set in the same manner as in FIG. 1.

The sample measurement device 10 is a flow cytometer in which: application light is applied to a sample flowing through a flow path 21 formed inside a flow cell 20; and images of particles in the sample to which the application light has been applied are taken. The sample measurement device 10 can perform measurement regarding the state of the particles, the sample, or the like by analyzing the taken images of the particles.

A measurement unit 63 includes a light applicator 100, the flow cell 20, an objective lens 31, a diaphragm 32, filters 33 and 34, a first lens 41, a second lens 42, a third lens 43, an optical block 200, and a light receiver 300.

The light applicator 100 applies application light to a sample flowing through the flow path 21 formed inside the flow cell 20. The application light includes lights having a plurality of wavelengths $\lambda 11$, $\lambda 12$, $\lambda 13$, and $\lambda 6$. When the application light is applied to the sample, light such as scattered light or fluorescence is generated from particles contained in the sample. The wavelength of the light that can be generated from the particles in the sample is predetermined according to the wavelength of the light applied by the light applicator 100 and a fluorescent label or the like applied to the particles in the sample. The light generated from the particles includes a light having a first wavelength, a light having a second wavelength, a light having a third wavelength, a light having a fourth wavelength, a light having a fifth wavelength, and a light having a sixth wavelength. Hereinafter, the light having the first wavelength, the light having the second wavelength, the light having the third wavelength, the light of the fourth wavelength, the light of the fifth wavelength, and the light having the sixth wavelength are respectively referred to as a light having a wavelength $\lambda 1$, a light having a wavelength $\lambda 2$, a light having a wavelength $\lambda 3$, a light having a wavelength $\lambda 4$, a light having a wavelength $\lambda 5$, and a light having the wavelength $\lambda 6$. In Embodiment 1, a "light having a wavelength $\lambda$" means a light having a wavelength in a predetermined range relative to a center wavelength $\lambda$.

Although FIG. 1 illustrates a state in which the application light is applied to the sample in the X-axis positive direction, the direction in which the application light is applied to the flow cell 20 is not limited thereto. As described later with reference to FIG. 3, in Embodiment 1, application light for causing excitation to generate fluorescence is applied to the sample in the Y-axis positive direction, and application light for obtaining a bright field image is applied to the sample in the X-axis positive direction.

The flow path 21 is formed in the Z-axis direction inside the flow cell 20, and a sample is caused to flow in the Z-axis positive direction through the flow path 21. The objective lens 31 collects the light generated from the sample to the X-axis positive side, so as to convert the light into collimated light. The first lens 41 is a convex lens that condenses the collimated light obtained through the collection and the conversion by the objective lens 31 and causes the condensed light to converge at the position of the diaphragm 32. The first lens 41 is configured to inhibit chromatic aberration. The first lens 41 may be composed of a plurality of lenses.

The diaphragm 32 is a flat plate parallel to a Y-Z plane, and a hole 32a is formed in the diaphragm 32 so as to penetrate therethrough in the X-axis direction. The hole 32a is located at the convergence position of the light condensed by the first lens 41. Since the diaphragm 32 is disposed, unnecessary light other than the light generated from the particles in the sample, e.g., light reflected by the outer surface of the flow cell 20 or the like, is blocked by the diaphragm 32, and only the light generated from the particles in the sample passes through the hole 32a and is guided to the second lens 42. In this manner, unnecessary light, i.e., light generated not from the particles in the sample, can be removed. The diaphragm 32 is not limited to a flat plate, and may be a diaphragm mechanism capable of changing the diameter of the hole 32a. In addition, if unnecessary light does not particularly pose any problem, the diaphragm 32 may be omitted.

The second lens 42 is a convex lens that collects the light having passed through the hole 32a of the diaphragm 32 so as to convert the light into collimated light, and guides the collimated light to the optical block 200. The second lens 42 is configured to inhibit chromatic aberration. The second lens 42 may be composed of a plurality of lenses. The filter 33 allows only the light generated from the particles in the sample to pass through the filter 33. Specifically, transmission wavelengths for the filter 33 are set such that the lights having the plurality of wavelengths $\lambda 1$, $\lambda 2$, $\lambda 3$, $\lambda 4$, $\lambda 5$, and $\lambda 6$ are transmitted through the filter 33, and light having a wavelength other than the plurality of wavelengths $\lambda 1$, $\lambda 2$, $\lambda 3$, $\lambda 4$, $\lambda 5$, and $\lambda 6$ is blocked by the filter 33. A phase modulation element may be disposed between the second lens 42 and the filter 33 so as to realize an extended depth of focus (EDoF).

Here, as described above, the application light that is applied to the sample includes the lights having the plurality of wavelengths $\lambda 11$, $\lambda 12$, and $\lambda 13$. The lights having the plurality of wavelengths $\lambda 11$, $\lambda 12$, and $\lambda 13$ each have a high beam intensity, and lights generated from the particles in the sample and having the plurality of wavelengths $\lambda 1$, $\lambda 2$, $\lambda 3$, $\lambda 4$, and $\lambda 5$ are, for example, fluorescences and have lower beam intensities than the application light. Thus, when the lights having the plurality of wavelengths $\lambda 11$, $\lambda 12$, and $\lambda 13$ enter a light receiving surface 311 of the light receiver 300, these lights become stray lights, resulting in reduction in the measurement accuracy of the lights generated from the particles. On the other hand, if the filter 33 configured to block the lights having the plurality of wavelengths $\lambda 11$, $\lambda 12$, and $\lambda 13$ is disposed, occurrence of stray lights guided to the light receiving surface 311 can be inhibited.

The optical block 200 refers to an optical component that is formed of a translucent material substantially homogeneous partially or entirely and thus allows transmission therethrough of light, and that refracts light with use of the difference between the speed of the light when advancing inside the optical block 200 and the speed of the light when advancing through an external space. As described later, the optical block 200 is composed of a plurality of prisms. The prisms composing the optical block 200 are each formed of, for example, glass, resin, rock crystal, or the like. The optical block 200 allows transmission therethrough of the light generated from the particles in the sample.

The optical block 200 has a first reflection surface, a second reflection surface, a third reflection surface, a fourth reflection surface, a fifth reflection surface, and a sixth reflection surface. Hereinafter, the first reflection surface, the second reflection surface, the third reflection surface, the fourth reflection surface, the fifth reflection surface, and the sixth reflection surface are respectively referred to as a reflection surface 201, a reflection surface 202, a reflection surface 203, a reflection surface 204, a reflection surface 205, and a reflection surface 206. The collimated light obtained through the conversion by the second lens 42 enters the optical block 200 in the X-axis positive direction. The plurality of the reflection surfaces 201 to 206 are arranged in this order along the advancement direction of the light that enters the optical block 200. The plurality of the reflection surfaces 201 to 206 selectively reflect the lights having the wavelengths different from one another so as to guide the lights to different light receiving regions 321 to 326 of the light receiver 300.

Here, the phrase "guide . . . to different light receiving regions of the light receiver" means indirectly guiding, as in the present embodiment, the lights outputted from the optical block 200 and having the plurality of wavelengths via another optical component such as the third lens 43 to the respective light receiving regions 321 to 326 of the light receiver 300, or directly guiding these lights to the respective light receiving regions 321 to 326 of the light receiver 300.

The reflection surface 201 reflects the light having the wavelength $\lambda 1$ and allows transmission therethrough of lights having wavelengths other than the wavelength $\lambda 1$. The reflection surface 202 reflects the light having the wavelength $\lambda 2$ and allows transmission therethrough of lights having wavelengths other than the wavelength $\lambda 2$. The reflection surface 203 reflects the light having the wavelength $\lambda 3$ and allows transmission therethrough of lights having wavelengths other than the wavelength $\lambda 3$. The reflection surface 204 reflects the light having the wavelength $\lambda 4$ and allows transmission therethrough of lights having wavelengths other than the wavelength $\lambda 4$. The reflection surface 205 reflects the light having the wavelength $\lambda 5$ and allows transmission therethrough of lights having wavelengths other than the wavelength $\lambda 5$. The reflection surface 206 reflects the light having the wavelength $\lambda 6$ and allows transmission therethrough of lights having wavelengths other than the wavelength $\lambda 6$.

The optical block 200 has, on the Y-axis positive side thereof, a first light outputting surface, a second light outputting surface, a third light outputting surface, a fourth light outputting surface, a fifth light outputting surface, and a sixth light outputting surface. Hereinafter, the first light outputting surface, the second light outputting surface, the third light outputting surface, the fourth light outputting surface, the fifth light outputting surface, and the sixth light outputting surface are respectively referred to as a light outputting surface 212, a light outputting surface 222, a light outputting surface 232, a light outputting surface 242, a light outputting surface 252, and a light outputting surface 262.

The plurality of the light outputting surfaces 212, 222, 232, 242, 252, and 262 respectively refract the lights reflected by the plurality of the reflection surfaces 201 to 206 and having the respective wavelengths. More specifically, the plurality of the light outputting surfaces 212, 222, 232, 242, 252, and 262 respectively refract the lights transmitted through the inside and having the plurality of wavelengths $\lambda 1$, $\lambda 2$, $\lambda 3$, $\lambda 4$, $\lambda 5$, and $\lambda 6$ such that the lights advance in directions different from one another. Accordingly, the plurality of the light outputting surfaces 212, 222, 232, 242, 252, and 262 respectively output the lights having the plurality of wavelengths $\lambda 1$, $\lambda 2$, $\lambda 3$, $\lambda 4$, $\lambda 5$, and $\lambda 6$ toward the plurality of corresponding light receiving regions 321 to 326 (see FIG. 7) of the light receiver 300. If the shapes of the plurality of the light outputting surfaces 212, 222, 232, 242, 252, and 262 are adjusted, the lights having the respective wavelengths can be guided to the different light receiving regions 321 to 326 of the light receiver 300.

The optical block 200 includes a first prism, a second prism, a third prism, a fourth prism, a fifth prism, a sixth prism, and a seventh prism. Hereinafter, the first prism, the second prism, the third prism, the fourth prism, the fifth prism, the sixth prism, and the seventh prism are respectively referred to as a prism 210, a prism 220, a prism 230, a prism 240, a prism 250, a prism 260, and a prism 270.

The optical block 200 is obtained by the seven prisms 210, 220, 230, 240, 250, 260, and 270 being formed integrally with each other. The phrase "the plurality of prisms being formed integrally with each other" refers to a state in which light does not pass through the outside (air) of any of the prisms when passing through the plurality of the reflection surfaces 201 to 206 of the optical block 200. Since the plurality of prisms are formed integrally with each other, the relationship in angle between the plurality of the reflection surfaces 201 to 206 of the optical block 200 does not change. The six reflection surfaces 201 to 206 are respectively formed on the X-axis negative-side slopes (light entry surfaces which allow entry thereinto of the light generated from the particles in the sample) of the six prisms 220, 230, 240, 250, 260, and 270. The configuration of the optical block 200 will be described later in detail with reference to FIG. 4 to FIG. 5B.

The filter 34 is disposed at a position through which the lights reflected by the plurality of the reflection surfaces 201 to 205 and having the plurality of wavelengths $\lambda 1$, $\lambda 2$, $\lambda 3$, $\lambda 4$, and $\lambda 5$ pass. The filter 34 blocks the light having the wavelength $\lambda 6$ and having leaked into a region through which the lights having the plurality of wavelengths $\lambda 1$, $\lambda 2$, $\lambda 3$, $\lambda 4$, and $\lambda 5$ pass. Specifically, transmission wavelengths for the filter 34 are set such that the lights having the plurality of wavelengths $\lambda 1$, $\lambda 2$, $\lambda 3$, $\lambda 4$, and $\lambda 5$ are transmitted through the filter 34, and light having a wavelength other than the plurality of wavelengths $\lambda 1$, $\lambda 2$, $\lambda 3$, $\lambda 4$, and $\lambda 5$ is blocked by the filter 34. The filter 34 is located off a position through which the light having the wavelength $\lambda 6$ passes toward the light receiving region 326 of the light receiver 300.

Here, the light having the wavelength $\lambda 6$ is a light that has been applied to the sample as an application light and transmitted through the particles in the sample. Thus, the beam intensity of the light having the wavelength $\lambda 6$ is higher than the beam intensity of any of the lights, such as fluorescences, which are generated from the particles in the sample and which have the plurality of wavelengths $\lambda 1$, $\lambda 2$, $\lambda 3$, $\lambda 4$, and $\lambda 5$. Therefore, when the light having the wavelength $\lambda 6$ enters any of the five light receiving regions 321 to 325 of the light receiver 300 which correspond to the lights having the plurality of wavelengths $\lambda 1$, $\lambda 2$, $\lambda 3$, $\lambda 4$, and $\lambda 5$, the light having the wavelength $\lambda 6$ becomes stray light, resulting in reduction in the measurement accuracy of the lights generated from the particles. On the other hand, if the filter 34 configured to block the light having the wavelength $\lambda 6$ is disposed, occurrence of stray light guided to any of the five light receiving regions 321 to 325 for the plurality of wavelengths $\lambda 1$, $\lambda 2$, $\lambda 3$, $\lambda 4$, and $\lambda 5$ can be inhibited.

The third lens 43 converges, to the light receiver 300, each of the lights which have the plurality of wavelengths $\lambda 1$, $\lambda 2$, $\lambda 3$, $\lambda 4$, and $\lambda 5$ and which have been reflected by the plurality of the reflection surfaces 201 to 205 of the optical block 200 and transmitted through the filter 34. In addition, the third lens 43 converges, to the light receiver 300, the light which has the wavelength $\lambda 6$ and which has been reflected by the reflection surface 206 of the optical block 200. The third lens 43 is configured to inhibit chromatic aberration. The third lens 43 may be composed of a plurality of lenses.

Although the light generated from the sample enters the optical block 200 as the collimated light in Embodiment 1, the light generated from the sample may enter the optical block 200 as collected light. In this case, the third lens 43 may be omitted.

The light receiver 300 receives the lights having the plurality of wavelengths $\lambda 1$, $\lambda 2$, $\lambda 3$, $\lambda 4$, $\lambda 5$, and $\lambda 6$ and having passed via the optical block 200, respectively in the light receiving regions 321 to 326 different from one another. The light receiver 300 is a TDI (time delay integration) camera. The light receiver 300 takes images of the lights having the respective wavelengths and having passed via the optical block 200, thereby generating taken images respectively corresponding to the lights having the respective wavelengths. As described later, the lights having the plurality of wavelengths $\lambda 1$, $\lambda 2$, $\lambda 3$, $\lambda 4$, and $\lambda 5$ are fluorescences generated from fluorescent dyes that stain target portions, and thus the taken images based on the lights having the plurality of wavelengths $\lambda 1$, $\lambda 2$, $\lambda 3$, $\lambda 4$, and $\lambda 5$ are fluorescence images. Since the light having the wavelength $\lambda 6$ is a light having transmitted through the particles, the taken image based on the light having the wavelength $\lambda 6$ is a bright field image. The light receiver 300 may be another camera such as a CCD camera. However, if the light receiver 300 is a TDI camera, taken images based on target portions can be obtained with higher accuracy.

As described above, when the lights having the plurality of wavelengths $\lambda 1$, $\lambda 2$, $\lambda 3$, $\lambda 4$, $\lambda 5$, and $\lambda 6$ different from one another are generated from the particles in the sample, these lights are respectively reflected by the plurality of the reflection surfaces 201 to 206 provided to the optical block 200, and are respectively guided to the different light receiving regions 321 to 326 of the light receiver 300. Since the common optical block 200 is used for the lights having the plurality of wavelengths, there is no need to use individual dichroic mirrors or the like for respectively guiding the lights having the respective wavelengths to the different light receiving regions 321 to 326. Since the optical block 200 in which the plurality of the reflection surfaces 201 to 206 have been formed integrally with each other is provided, the angles formed between the respective reflection surfaces are fixed. Accordingly, it becomes unnecessary to individually make any adjustments such as optical-axis alignment for a plurality of optical components, for the plurality of wavelengths. Therefore, operational burden can be lessened at the time of assembly and at the time of maintenance of the sample measurement device 10.

In addition, since the plurality of prisms 210, 220, 230, 240, 250, 260, and 270 are formed integrally with each other, none of the plurality of the reflection surfaces 201 to 206 are exposed to the outside (air). Accordingly, the optical axes of the respective lights reflected by the plurality of the reflection surfaces 201 to 206 can be inhibited from deviating from desired directions beyond expectation. Therefore, the lights that reach the desired light receiving regions of the light receiver 300 can be inhibited from decreasing.

The above description has explained an example in which the lights having wavelengths including the plurality of wavelengths $\lambda 11$, $\lambda 12$, $\lambda 13$, and $\lambda 6$ are simultaneously applied as the application light to the sample flowing through the flow path 21 of the flow cell 20 so that the lights having the plurality of wavelengths $\lambda 1$, $\lambda 2$, $\lambda 3$, $\lambda 4$, $\lambda 5$, and $\lambda 6$ can be generated from the sample.

However, the present invention is not limited thereto. The lights to be simultaneously applied only have to be determined according to: the types of fluorescent dyes that stain target portions described later; the number of the target portions to be stained; whether or not a bright field image is to be obtained; and the like. In addition, only at least one of the lights having the plurality of wavelengths $\lambda 11$, $\lambda 12$, $\lambda 13$, and $\lambda 6$ has to be applied as the application light. In this case, at least one of the lights having the plurality of wavelengths $\lambda 1$, $\lambda 2$, $\lambda 3$, $\lambda 4$, $\lambda 5$, and $\lambda 6$ is generated from the particles in the sample according to the wavelength of a light having been applied as the application light to the sample.

Figure 2:
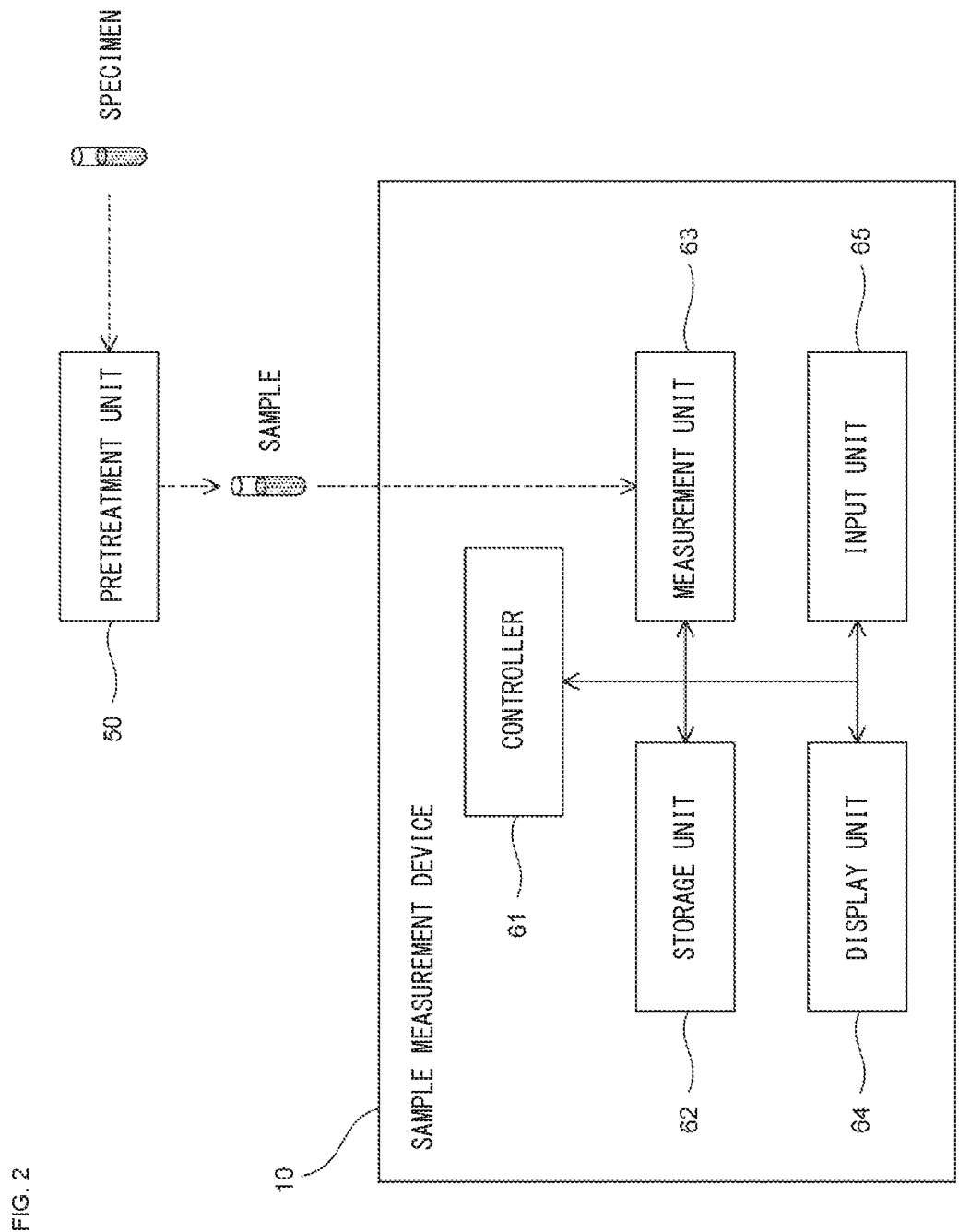
FIG. 2 is a block diagram showing the configuration of the sample measurement device according to Embodiment 1.

FIG. 2 is a block diagram showing the configuration of the sample measurement device 10.

A pretreatment unit 50 performs a predetermined treatment on whole blood collected as a specimen from a subject, and extracts white blood cells as particles to be measured. The specimen to be collected from a subject may be plasma, cerebrospinal fluid, tissue fluid, or urine other than whole blood collected from an organism. The particles to be measured are not limited to white blood cells, and may be, for example, other cells such as epithelial cells, or exosomes of endoplasmic reticulum.

In addition, the pretreatment unit 50 uses a staining reagent to stain, with a fluorescent dye, a target portion of each of the particles to be measured. The target portion is nucleus or gene in the particle to be measured, polypeptide on the surface of the particle to be measured, or the like. Nucleus can be specifically stained with a nucleus-staining fluorescent dye. Gene and polypeptide on the surface of the particle can be stained by being hybridized to a labeled antibody including a fluorescent dye. In Embodiment 1, fluorescence images based on the five types of wavelengths $\lambda 1$, $\lambda 2$, $\lambda 3$, $\lambda 4$, and $\lambda 5$ can be obtained, and thus up to five target portions can be selected from among nucleus in each particle, a predetermined gene in the particle, a predetermined polypeptide on the surface of the particle, and the like.

If five target portions are selected and the five target portions are defined as P1 to P5, the target portion P1 is stained with a fluorescent dye that generates a fluorescence having the wavelength $\lambda 1$ when an excitation light having the wavelength $\lambda 11$ is applied to the fluorescent dye. The target portion P2 is stained with a fluorescent dye that generates a fluorescence having the wavelength $\lambda 2$ when the excitation light having the wavelength $\lambda 11$ is applied to the fluorescent dye. The target portion P3 is stained with a fluorescent dye that generates a fluorescence having the wavelength $\lambda 3$ when an excitation light having the wavelength $\lambda 12$ is applied to the fluorescent dye. The target portion P4 is stained with a fluorescent dye that generates a fluorescence having the wavelength $\lambda 4$ when the excitation light having the wavelength $\lambda 12$ is applied to the fluorescent dye. The target portion P5 is stained with a fluorescent dye that generates a fluorescence having the wavelength $\lambda 5$ when an excitation light having the wavelength $\lambda 13$ is applied to the fluorescent dye. The plurality of wavelengths $\lambda 11$, $\lambda 12$, $\lambda 13$, $\lambda 1$, $\lambda 2$, $\lambda 3$, $\lambda 4$, $\lambda 5$, and $\lambda 6$ are different from one another.

The sample measurement device 10 measures and analyzes a sample prepared through the pretreatment by the pretreatment unit 50. A controller 61 is, for example, a CPU. A storage unit 62 is, for example, a ROM, a RAM, or a hard disk. The controller 61 controls each component in the sample measurement device 10 according to a program and data stored in the storage unit 62.

The measurement unit 63 includes the various optical components shown in FIG. 1, and various optical components described later with reference to FIG. 3. The controller 61 allows measurement of the sample by driving four light sources 101 to 104 (see FIG. 3) of the measurement unit 63, a mechanism for causing the sample to flow through the flow path 21 (see FIGS. 1 and 3) of the flow cell 20, the light receiver 300 (see FIG. 1), and the like. The controller 61 obtains taken images generated by the light receiver 300, and stores the obtained taken images in the storage unit 62. The controller 61 analyzes the sample on the basis of the obtained taken images, and causes the display unit 64 to display the result of the analysis. The display unit 64 is, for example, a liquid crystal display, a plasma display, a CRT (Cathode Ray Tube) display, or the like. An input unit 65 is, for example, a mouse or a keyboard.

As described above, the five portions P1 to P5 of the white blood cells in the sample to be measured are fluorescently labeled, and the light receiver 300 receives fluorescences generated from the five portions P1 to P5 and having the plurality of wavelengths different from one another. Accordingly, the controller 61 can analyze in detail the white blood cells to be measured, on the basis of the fluorescences having the plurality of wavelengths.

Figure 3:
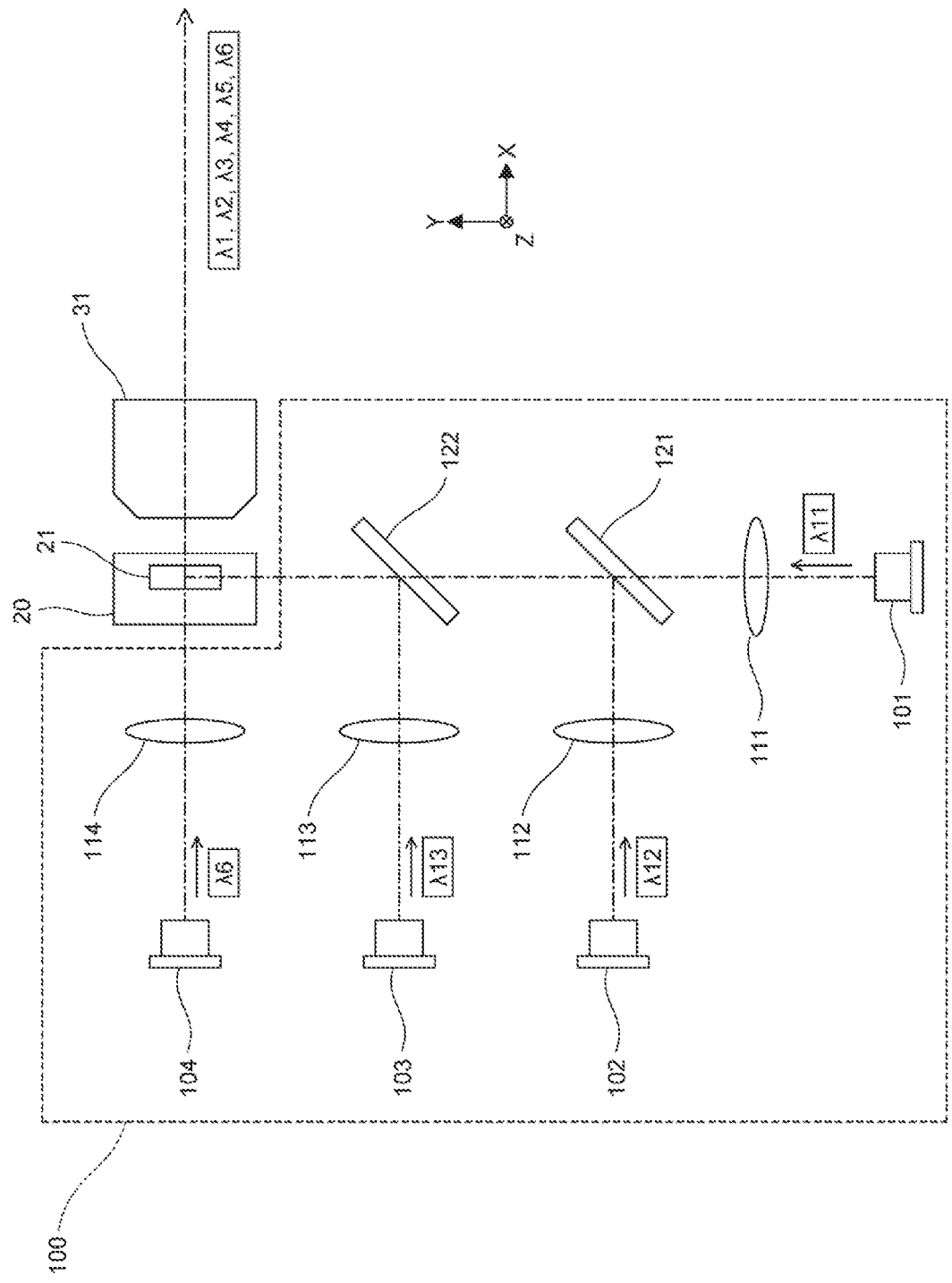
FIG. 3 is a schematic diagram showing a configuration a light applicator according to Embodiment 1.

FIG. 3 is a schematic diagram showing a configuration of the light applicator 100.

The light applicator 100 includes the four light sources 101 to 104, four condenser lenses 111 to 114, and two dichroic mirrors 121 and 122.

The four light sources 101 to 104 are semiconductor laser light sources. Lights emitted from the four light sources 101 to 104 are respectively laser lights having the four different wavelengths $\lambda 11$, $\lambda 12$, $\lambda 13$, and $\lambda 6$. The four condenser lenses 111 to 114 respectively condense the lights emitted from the four light sources 101 to 104. The dichroic mirror 121 allows transmission therethrough of the light having the wavelength $\lambda 11$, and reflects the light having the wavelength $\lambda 12$. The dichroic mirror 122 allows transmission therethrough of the lights having the two wavelengths $\lambda 11$ and $\lambda 12$, and reflects the light having the wavelength $\lambda 13$. The lights having the three wavelengths $\lambda 11$, $\lambda 12$, and $\lambda 13$ are applied in the Y-axis positive direction to the flow path 21 of the flow cell 20. The light having the wavelength $\lambda 6$ is applied in the X-axis positive direction to the flow path 21 of the flow cell 20. The sample containing the particles to be measured is caused to flow through the flow path 21 of the flow cell 20.

When the lights having the three wavelengths $\lambda 11$, $\lambda 12$, and $\lambda 13$ are applied to the sample flowing through the flow path 21 of the flow cell 20, fluorescences are generated from the particles that are to be measured and that are contained in the sample. Specifically, fluorescences having the five wavelengths $\lambda 1$, $\lambda 2$, $\lambda 3$, $\lambda 4$, and $\lambda 5$ are respectively generated from the five target portions P1 to P5 of the particles. Meanwhile, when the light having the wavelength $\lambda 6$ is applied to the sample flowing through the flow path 21 of the flow cell 20, this light is transmitted through the particles that are to be measured and that are contained in the sample. The light transmitted through the particles and having the wavelength $\lambda 6$ is used for generating a bright field image.

Figure 4:
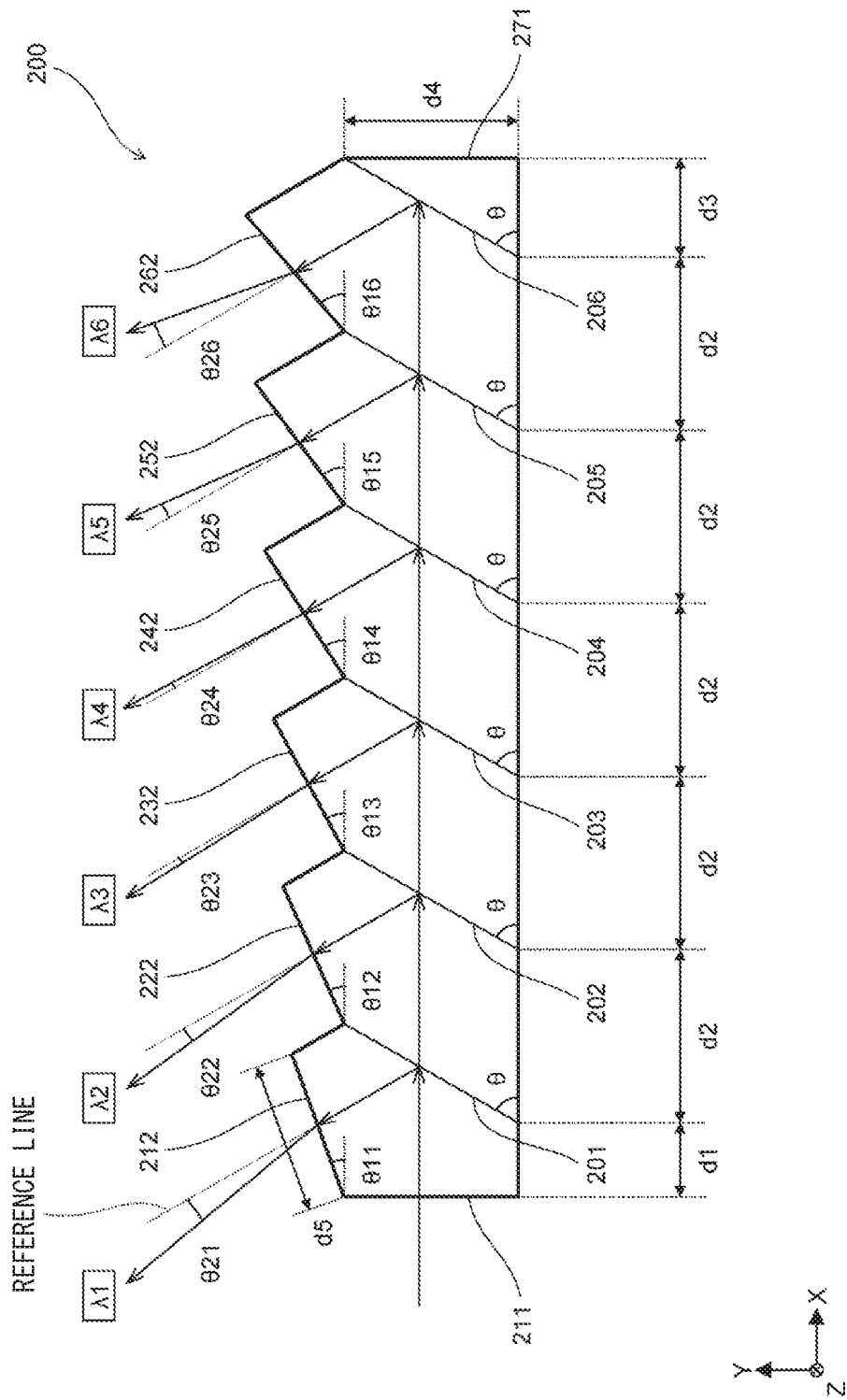
FIG. 4 is a schematic diagram showing a configuration of prisms according to Embodiment 1.

FIG. 4 is a schematic diagram showing a configuration of the optical block 200.

As described above, the optical block 200 has the plurality of the reflection surfaces 201 to 206. The plurality of the reflection surfaces 201 to 206 are tilted in the same direction with respect to the advancement direction of the light that enters the optical block 200, i.e., the X-axis positive direction. That is, as for each of the plurality of the reflection surfaces 201 to 206, the X-axis negative-side face which allows entry thereinto of light is tilted so as to be oriented to the Y-axis positive side in an X-Y plane. In addition, the plurality of the reflection surfaces 201 to 206 are tilted at the same angle θ with respect to the X-axis positive direction in the X-Y plane. Since the plurality of the reflection surfaces 201 to 206 are tilted in the same direction with respect to the X-axis positive direction, the lights reflected by the plurality of the reflection surfaces 201 to 206 of the optical block 200 are directed to one direction side, and thus the lights having passed via the optical block 200 can be easily received by the single light receiver 300. Accordingly, the sample measurement device 10 can be configured in a simple manner as compared to the case where a plurality of the light receivers are disposed.

As described above, the optical block 200 has the plurality of the light outputting surfaces 212, 222, 232, 242, 252, and 262. In Embodiment 1, the plurality of the light outputting surfaces 212, 222, 232, 242, 252, and 262 are formed as flat surfaces that are respectively tilted at angles θ11, θ12, θ13, θ14, θ15, and θ16 with respect to the X-axis positive direction in the X-Y plane. The angles θ11, θ12, θ13, θ14, θ15, and θ16 are different from one another. Accordingly, the lights having the respective wavelengths can be guided to the corresponding light receiving regions of the light receiver 300 through adjustment of the angles of the plurality of the light outputting surfaces 212, 222, 232, 242, 252, and 262.

The plurality of the light outputting surfaces 212, 222, 232, 242, 252, and 262 are not limited to flat surfaces, and may be lens surfaces. In this case, the lights having the respective wavelengths and having passed through the plurality of the light outputting surfaces 212, 222, 232, 242, 252, and 262 can be caused to converge, and thus it is also possible to omit the third lens 43.

Figure 5A:
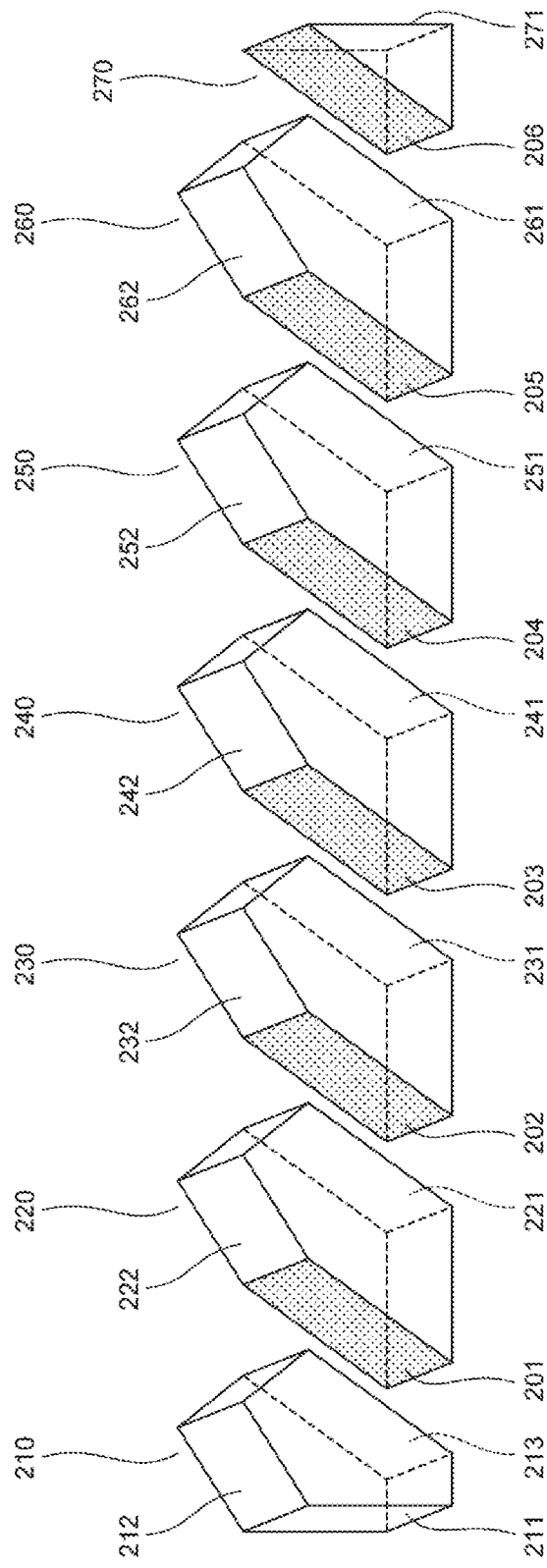
FIG. 5A is a perspective view schematically showing the prisms according to Embodiment 1 before assembly.

FIG. 5A is a perspective view schematically showing the optical block 200 before assembly.

As described above, the optical block 200 is obtained by the seven prisms 210, 220, 230, 240, 250, 260, and 270 being formed integrally with each other. A slope 213 of the prism 210, the reflection surface 201 and a slope 221 of the prism 220, the reflection surface 202 and a slope 231 of the prism 230, the reflection surface 203 and a slope 241 of the prism 240, the reflection surface 204 and a slope 251 of the prism 250, the reflection surface 205 and a slope 261 of the prism 260, and the reflection surface 206 of the prism 270, are parallel to one another. A light entry surface 211 parallel to the Y-Z plane is formed on the X-axis negative side of the prism 210, and a back surface 271 parallel to the Y-Z plane is formed on the X-axis positive side of the prism 270.

Thin films such as dielectric multilayer films are vapor-deposited on the X-axis negative-side slopes (light entry surfaces which allow entry thereinto of the light generated from the particles in the sample) of the plurality of prisms 220, 230, 240, 250, 260, and 270, whereby the plurality of the reflection surfaces 201, 202, 203, 204, 205, and 206 are respectively formed. If the thicknesses of the dielectric multilayer films to be vapor-deposited are changed, the wavelengths of the lights to be reflected by and transmitted through the respective reflection surfaces can be adjusted. That is, the dielectric multilayer films formed at the plurality of the reflection surfaces 201 to 206 have different thicknesses. The plurality of the reflection surfaces 201 to 206 are so-called dichroic surfaces. The plurality of the reflection surfaces 201 to 206 are, as described above, wavelength-selective surfaces that reflect lights having predetermined wavelengths and that allow transmission therethrough of lights having wavelengths other than the predetermined wavelengths.

Figure 5B:
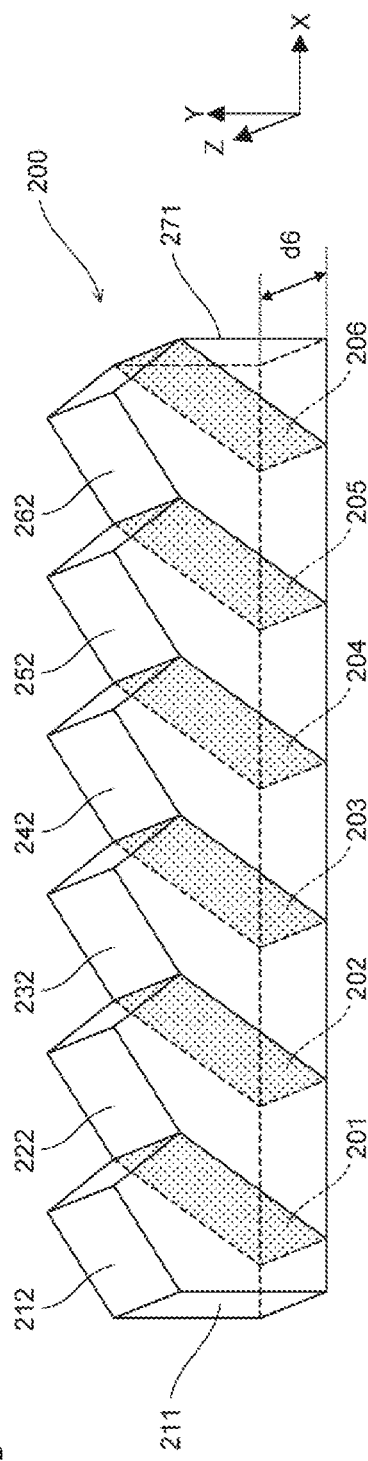
FIG. 5B is a perspective view schematically showing the prisms according to Embodiment 1 having been assembled.

After the plurality of the reflection surfaces 201 to 206 are formed, the slope 213 of the prism 210 and the reflection surface 201 are joined, the slope 221 of the prism 220 and the reflection surface 202 are joined, the slope 231 of the prism 230 and the reflection surface 203 are joined, the slope 241 of the prism 240 and the reflection surface 204 are joined, the slope 251 of the prism 250 and the reflection surface 205 are joined, and the slope 261 of the prism 260 and the reflection surface 206 are joined. Accordingly, the optical block 200 in which the plurality of prisms 210, 220, 230, 240, 250, 260, and 270 have been formed integrally with each other is completed as shown in FIG. 5B. With such an assembly method, the optical block 200 can be easily formed into a predetermined shape.

The plurality of prisms 210, 220, 230, 240, 250, 260, and 270 may be joined with use of an adhesive such as a UV-curable adhesive, or may be joined (brought into optical contact with each other), without using any bonding agent, by intermolecular forces between joining surfaces of the respective prisms through polishing of the joining surfaces with high accuracy.

The wavelength-selective surfaces may be formed on the slope 213 of the prism 210, the slope 221 of the prism 220, the slope 231 of the prism 230, the slope 241 of the prism 240, the slope 251 of the prism 250, and the slope 261 of the prism 260.

The plurality of prisms 210, 220, 230, 240, 250, and 260 may be, in a state of not having yet been assembled, each further composed of two prisms. For example, as shown in FIG. 6, the prism 210 may be composed of two prisms 210a and 210b, the prism 220 may be composed of two prisms 220a and 220b, the prism 230 may be composed of two prisms 230a and 230b, the prism 240 may be composed of two prisms 240a and 240b, the prism 250 may be composed of two prisms 250a and 250b, and the prism 260 may be composed of two prisms 260a and 260b. The plurality of prisms 210b, 220b, 230b, 240b, 250b, and 260b respectively have the plurality of the light outputting surfaces 212, 222, 232, 242, 252, and 262, and each have a triangular prism shape.

In order to assemble the optical block 200 from the state in FIG. 6, surfaces of the prism 210a and the prism 210b facing each other are joined by the same method as that described above with reference to FIGS. 5A and 5B. In the same manner, the prism 220a and the prism 220b are joined, the prism 230a and the prism 230b are joined, the prism 240a and the prism 240b are joined, the prism 250a and the prism 250b are joined, and the prism 260a and the prism 260b are joined. Accordingly, the prisms assume the same states as those in FIG. 5A, and then, are joined as in FIG. 5B.

FIG. 7 is a schematic diagram showing a configuration of the light receiver 300.

As described above, the light receiver 300 is a TDI camera. The light receiver 300 includes an image-taking element 310 implemented by an integrated circuit for taking an image of received light. The image-taking element 310 has the light receiving surface 311. The light receiving surface 311 is a surface that receives lights having entered the light receiver 300 and that corresponds to a region in which pixels for generating signals are arranged. On the light receiving surface 311, the six different light receiving regions 321 to 326 for respectively receiving the lights having the six wavelengths $\lambda 1$, $\lambda 2$, $\lambda 3$, $\lambda 4$, $\lambda 5$, and $\lambda 6$ are set. The different light receiving regions 321 to 326 each have a rectangular shape extending in the Z-axis direction, and are arranged in the width direction so as not to overlap with each other on the light receiving surface 311. The width direction is a direction parallel to a horizontal plane and the light receiving surface 311. Here, the "different light receiving regions" mean regions located at different positions on the light receiving surface 311 of the light receiver 300.

In FIG. 7, the light receiving region 321 at the left end receives a fluorescence having the wavelength $\lambda 1$ for a fluorescence image. The light receiving region 322 at the second position from the left receives a fluorescence having the wavelength $\lambda 2$ for a fluorescence image. The light receiving region 323 at the third position from the left receives a fluorescence having the wavelength $\lambda 3$ for a fluorescence image. The light receiving region 324 at the third position from the right receives a fluorescence having the wavelength $\lambda 4$ for a fluorescence image. The light receiving region 325 at the second position from the right receives a fluorescence having the wavelength $\lambda 5$ for a fluorescence image. The light receiving region 326 at the right end receives a light having the wavelength $\lambda 6$ for a bright field image.

As indicated by white arrows, the positions of the lights which have been generated from the particles to be measured and which are being projected in the six light receiving regions 321 to 326 are respectively shifted in the Z-axis positive direction within the six light receiving regions 321 to 326 as the particles move in the Z-axis positive direction through the flow path 21 of the flow cell 20. In the six light receiving regions 321 to 326 in FIG. 7, images of the lights generated from the particles to be measured are indicated by dotted lines, for convenience. The sizes of the six light receiving regions 321 to 326 are set such that the images of the lights generated from the particles to be measured are located within the light receiving regions.

As described above, the lights having the respective wavelengths and reflected by the plurality of the reflection surfaces 201 to 206 of the optical block 200 are separated on the single light receiving surface 311, and thus the light receiver 300 can take images of the beam spots moving within the six light receiving regions 321 to 326, whereby taken images corresponding to the lights having the respective wavelengths can be generated.

Next, the length and the angle of each component of the optical block 200 will be described with reference to FIG. 4, FIG. 5B, and FIG. 7.

As shown in FIG. 4, the plurality of the reflection surfaces 201 to 206 are each tilted at an angle $\theta$ with respect to the X-axis direction in the X-Y plane. For example, the angle $\theta$ in the present Embodiment 1 is set to 60°. The plurality of the light outputting surfaces 212, 222, 232, 242, 252, and 262 are respectively tilted at angles $\theta 11$, $\theta 12$, $\theta 13$, $\theta 14$, $\theta 15$, and $\theta 16$ with respect to the X-axis direction in the X-Y plane.

The light entry surface 211 through which the light enters the optical block 200 is a flat surface parallel to the Y-Z plane. The distance between the light entry surface 211 and an end in the Y-axis negative direction of the reflection surface 201 is d1. In the X-axis direction, the distance between the reflection surface 201 and the reflection surface 202, the distance between the reflection surface 202 and the reflection surface 203, the distance between the reflection surface 203 and the reflection surface 204, the distance between the reflection surface 204 and the reflection surface 205, and the distance between the reflection surface 205 and the reflection surface 206, are each d2. The back surface 271 on the X-axis positive side of the optical block 200 is a flat surface parallel to the Y-Z plane. The distance between the back surface 271 and an end in the Y-axis negative direction of the reflection surface 206 is d3. The length in the Y-axis direction of the light entry surface 211, and the length in the Y-axis direction of the back surface 271, are each d4. The lengths of the plurality of the light outputting surfaces 212, 222, 232, 242, 252, and 262 in the X-Y plane are each d5. As shown in FIG. 5B, the length in the Z-axis direction of the optical block 200 is d6.

In the present Embodiment 1, for example, the distance d1 is set to 2 mm, the distance d2 is set to 6 mm, the distance d3 is set to 4 mm, the length d4 is set to $4\sqrt{3}$ mm, the length d5 is set to 5 mm, and the length d6 is set to 10 mm.

As shown in FIG. 4, lights reflected by two adjacent reflection surfaces among the plurality of the reflection surfaces 201 to 206 each need to enter a corresponding one of the light outputting surfaces. For example, the interval between the reflection surface 201 and the reflection surface 202, and the interval between the reflection surface 202 and the reflection surface 203, are set such that a light reflected by the reflection surface 202 enters neither of the plurality of the light outputting surfaces 212 nor 232 adjacent to the light outputting surface 222 which this light should enter. The same applies to the other reflection surfaces 201 and 203 to 206. That is, the intervals between the plurality of the reflection surfaces 201 to 206 have widths that each prevent a corresponding one of the lights reflected by the plurality of the reflection surfaces 201 to 206 from entering any light outputting surface that is adjacent to a corresponding one of the light outputting surfaces. From this viewpoint, the distance d2 is set to 6 mm. If the distance d2 is thus set, the lights having the respective wavelengths can be inhibited from overlapping with one another on the light receiving surface 311 (see FIG. 7) of the light receiver 300. Accordingly, signals, i.e., taken images, based on the lights having the respective wavelengths can be obtained with high accuracy.

As shown in FIG. 4, the lights reflected by the plurality of the reflection surfaces 201 to 206 are respectively refracted by the plurality of the light outputting surfaces 212, 222, 232, 242, 252, and 262 so that the advancement directions thereof are changed in the X-Y plane. If the directions of the lights respectively reflected by the plurality of the reflection surfaces 201 to 206 are referred to as "reference lines", the angles formed by the lights outputted from the plurality of the light outputting surfaces 212, 222, 232, 242, 252, and 262 with respect to the respective reference lines from the plurality of the reflection surfaces 201 to 206, are θ21, θ22, θ23, θ24, θ25, and θ26. If a clockwise angle with respective to each reference line as seen in the Z-axis positive direction is defined as a positive angle, the angles θ21, θ22, and θ23 have negative values and the angles θ24, θ25, and θ26 have positive values in the example shown in FIG. 4.

In Embodiment 1, angular differences θ22-θ21, θ23-θ22, θ24-θ23, θ25-θ24, and θ26-θ25 are the same angular difference Δθ.

As shown in FIG. 7, the distances in the width direction between the centers of the adjacent light receiving regions on the light receiving surface 311 are each Δx. Here, if the focal distance of the third lens 43 is defined as f3, the angular difference Δθ is calculated according to the following equation (1).

$$\Delta\theta = \text{Arc tan}(\Delta x/f3) \tag{1}$$

Therefore, the tilts of the plurality of the light outputting surfaces 212, 222, 232, 242, 252, and 262 of the optical block 200 are set such that the angular differences between the output directions of the lights from the adjacent light outputting surfaces each become the angular difference Δθ calculated according to the above-described equation (1).

FIG. 8A is a schematic diagram for describing a reduction optical system 400 of the measurement unit 63, and the total magnification of the entire optical system of the measurement unit 63. FIG. 8A shows, for convenience, the flow cell 20, the objective lens 31, the first lens 41, the second lens 42, the third lens 43, and the light receiver 300. In addition, FIG. 8A shows, for convenience, a situation in which collimated light obtained by the second lens 42 directly enters the third lens 43 and is then condensed to the light receiving surface 311 of the light receiver 300.

The reduction optical system 400 includes the first lens 41 and the second lens 42 shown in FIG. 1. The above-described objective lens 31 collects the light generated from the sample so as to convert the light into collimated light, and guides the collimated light to the reduction optical system 400.

The first lens 41 and the second lens 42 are convex lenses, and share the same focal position. If the focal distance of the first lens 41 is defined as f1 and the focal distance of the second lens 42 is defined as f2, the first lens 41 and the second lens 42 are disposed such that the interval between the first lens 41 and the second lens 42 equals f1+f2. In this case, the focal position of the first lens 41 and the focal position of the second lens 42 are the same with each other. In addition, the focal distances of the first lens 41 and the second lens 42 are set so as to satisfy f1>f2. Accordingly, the collimated light from the objective lens 31 is reduced in beam size, turned into collimated light by the reduction optical system 400, and outputted from the reduction optical system 400. Specifically, the beam diameter of the collimated light outputted from the reduction optical system 400 is f2/f1 of the beam diameter of the collimated light entering the reduction optical system 400.

If the reduction optical system 400 thus reduces the beam size of the light generated from the sample, converts the light obtained by the reduction into collimated light, and guides the collimated light to the optical block 200, the size of the optical block 200 can be made small. Accordingly, the size of the entire sample measurement device 10 can be made small.

Next, the total magnification of the entire optical system of the measurement unit 63 will be described with reference to FIG. 8A.

The total magnification of the entire optical system is defined as M, and the focal distance of the objective lens 31 is defined as f0. As described above, the focal distances of the first lens 41, the second lens 42, and the third lens 43 are respectively f1, f2, and f3. The flow cell 20 and the objective lens 31 are disposed such that the interval between the flow path 21 of the flow cell 20 and the objective lens 31 equals f0. The third lens 43 and the light receiver 300 are disposed such that the interval between the third lens 43 and the light receiving surface 311 of the light receiver 300 equals f3. At what sizes the lights generated from the particles that are to be measured and that are flowing through the flow path 21 of the flow cell 20 are to be applied to the light receiving surface 311 of the light receiver 300, is determined by the total magnification M. The total magnification M can be calculated according to the following equation (2) with use of the focal distances f0 to f3.

$$M = (-f1/f0) \times (-f3/f2) \tag{2}$$

In a case where the total magnification M is set to, for example, 60 fold as a target value, M=60 is applied in the above-described equation (2), and the focal distance of each of the lenses is set. In a case where a general objective lens is used as the objective lens 31, the focal distance f0 of the objective lens 31 is 3 mm. If M=60 and f0=3 mm are applied in the above-described equation (2) and equation (2) is transformed, the following equation (3) is obtained.

$$f3 = 180 \times (f2/f1) \quad (3)$$

Referring to the above-described equation (3), it is found that the value of f3 can be made small by making the value of f2/f1 small. Therefore, if, for example, f1=30 mm and f2=15 mm are applied, f3 can be set to 90 mm.

FIG. 8B is a diagram showing a comparative example in a case where f1=f2 is applied in the reduction optical system 400 shown in FIG. 8A.

In the case where the focal distances of the first lens 41 and the second lens 42 are equal to each other as shown in FIG. 8B, f2/f1=1 is obtained. In this case, if f2/f1=1 is applied in the above-described equation (3), f3=180 mm is obtained. Similarly, also in a case where the reduction optical system 400 is not used, since f2/f1 is eliminated in the above-described equation (3), f3=180 mm is obtained. In the case where the focal distances of the first lens 41 and the second lens 42 are equal to each other or the reduction optical system 400 is not used as described above, the focal distance f3 of the third lens 43 becomes so long as to be 180 mm.

On the other hand, in Embodiment 1, the value of f2/f1, i.e., the reduction ratio of the reduction optical system 400, is set to be so low as to be ½ in order to realize the target total magnification M, whereby the focal distance f3 of the third lens 43 can be made so short as to be 90 mm. Therefore, the distance from the third lens 43 to the light receiver 300 can be made short while the desired total magnification M is realized. Thus, the sample measurement device 10 can be downsized in the arrangement direction of the third lens 43 and the light receiver 300.

In addition, the total magnification M becomes large if the focal distance f1 is made longer than the focal distance f2, in other words, if the reduction ratio f2/f1 of the reduction optical system 400 is set to be low, as indicated in the above-described equation (2). Therefore, if the reduction ratio of the reduction optical system 400 is made low, optical images based on lights generated from fine particles can be set to be large on the light receiving surface 311.

Although the second lens 42 of the reduction optical system 400 is a convex lens in Embodiment 1, the second lens 42 may be a concave lens.

Figure 9:
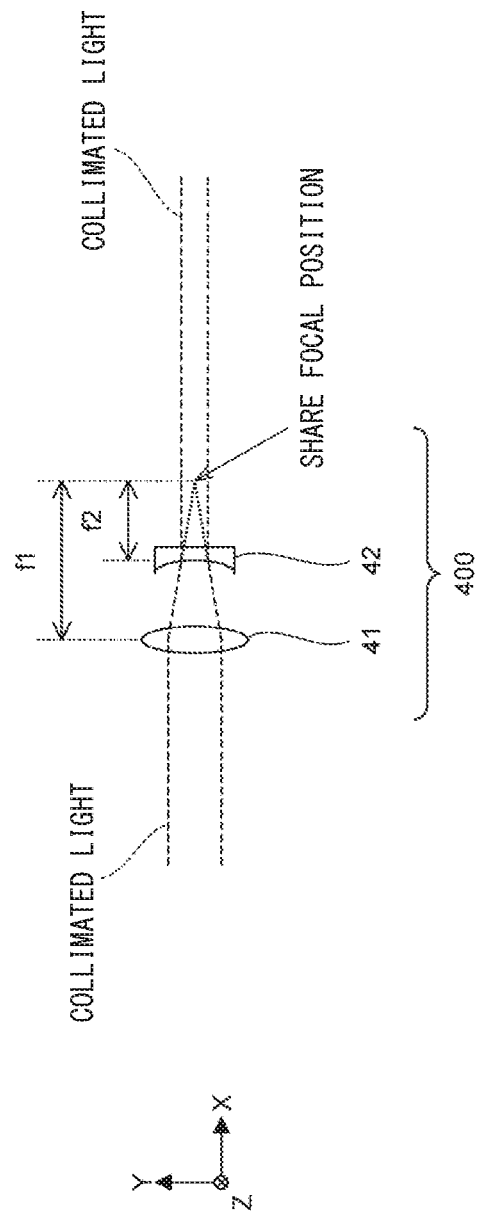
FIG. 9 is a schematic diagram showing a configuration of a reduction optical system according to a modification of Embodiment 1.

FIG. 9 is a diagram showing a modification of the reduction optical system 400 in the case where the second lens 42 is implemented by a concave lens. Also in this case, the focal position of the first lens 41 and the focal position of the second lens 42 are the same with each other. Also in the configuration in FIG. 9, the reduction optical system 400 enables light generated from a sample to be reduced in beam size, turned into collimated light, and guided to the optical block 200, whereby the size of the optical block 200 can be reduced. In addition, also in the configuration in FIG. 9, the relationship in the above-described equation (2) is satisfied, and if, for example, f0=3 mm, f1=30 mm, f2=−15 mm, and f3=90 mm are applied, M=−60 fold is obtained. Therefore, in the same manner as described above, the focal distance f3 of the third lens 43 can be made short by making the value of the reduction ratio f2/f1 of the reduction optical system 400 small. Thus, the sample measurement device 10 can be downsized while the desired total magnification M is realized.

However, in the configuration in FIG. 9, no diaphragm 32 having a sufficiently small hole 32a can be disposed. Thus, if unnecessary light needs to be removed by the diaphragm 32, the second lens 42 is preferably a convex lens as shown in FIG. 8A.

Figure 10:
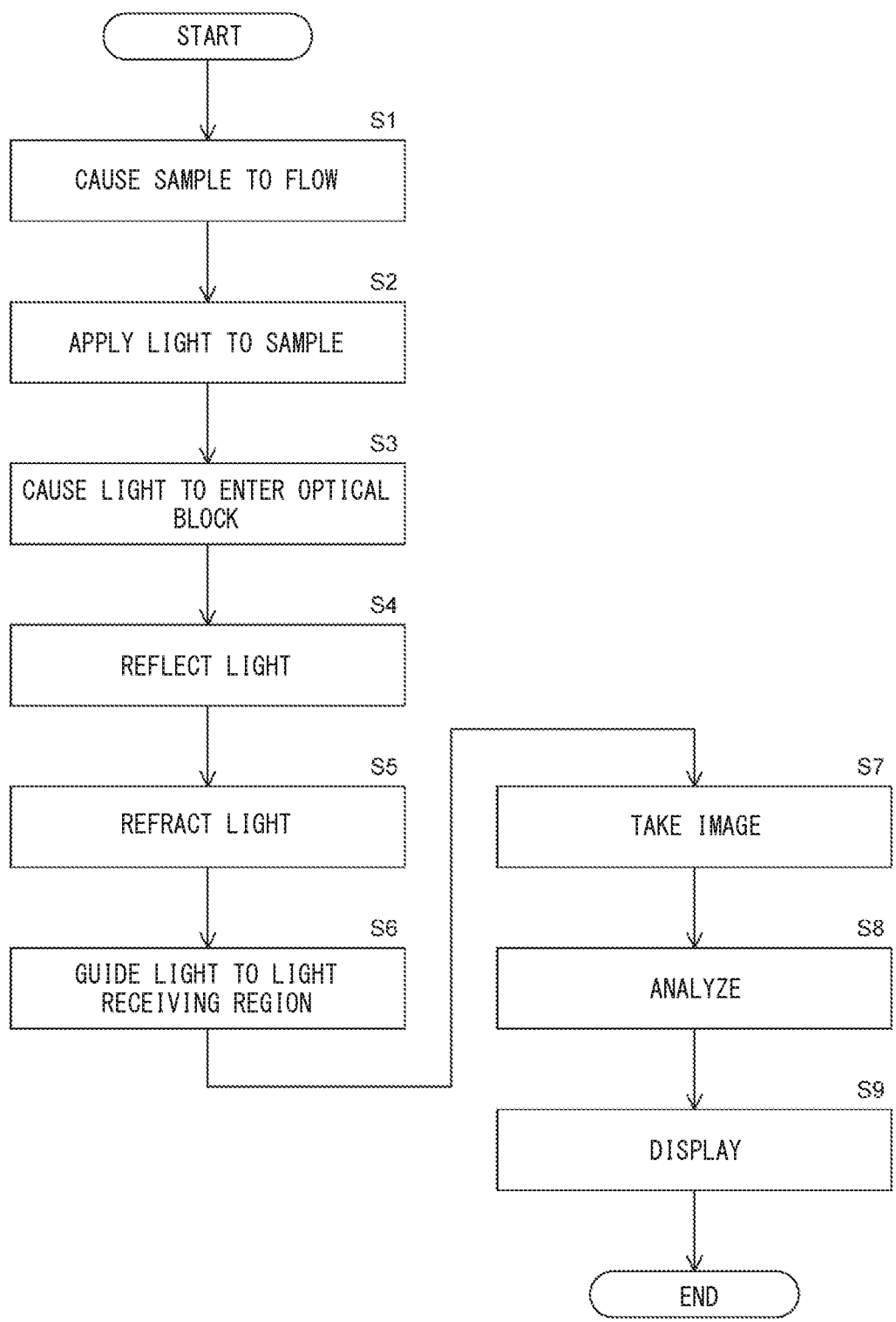
FIG. 10 is a flowchart indicating measurement operations by the sample measurement device according to Embodiment 1.

FIG. 10 is a flowchart indicating measurement operations by the sample measurement device 10.

In step S1 of causing a sample to flow, the controller 61 causes a sample prepared through pretreatment by the pretreatment unit 50 to flow through the flow path 21 of the flow cell 20. In step S2 of applying light to the sample, the controller 61 causes the application light including lights having the plurality of wavelengths $\lambda 11$, $\lambda 12$, $\lambda 13$, and $\lambda 6$ to be applied to the sample flowing through the flow path 21 of the flow cell 20.

In step S3 of causing the light to enter the optical block, the objective lens 31, the first lens 41, the second lens 42, and the filter 33 allow entry, into the optical block 200, of the light generated from particles in the sample to which the application light has been applied. Accordingly, the fluorescences having the plurality of wavelengths $\lambda 1$, $\lambda 2$, $\lambda 3$, $\lambda 4$, and $\lambda 5$ and the light having the wavelength $\lambda 6$ and used for generating a bright field image which have been generated on the X-axis positive direction side of the flow cell 20, enter the light entry surface 211 of the optical block 200 and are transmitted through the inside of the optical block 200.

In step S4 of reflecting the lights, the optical block 200 allows the lights having the wavelengths different from one another and having entered the optical block 200 to be selectively reflected by the plurality of the reflection surfaces 201 to 206. In step S5 of refracting the lights, the optical block 200 allows the lights having the wavelengths different from one another and reflected by the plurality of the reflection surfaces 201 to 206 to be refracted by the light outputting surfaces 212, 222, 232, 242, 252, and 262. In step S6 of guiding the lights to the light receiving regions, the lights outputted from the light outputting surfaces 212, 222, 232, 242, 252, and 262 are respectively guided to the six corresponding light receiving regions 321 to 326.

In image-taking step S7, the light receiver 300 generates taken images that correspond to the lights having the respective wavelengths and received in the six light receiving regions 321 to 326. In analyzing step S8, the controller 61 uses the taken images obtained in image-taking step S7 to analyze the white blood cells to be measured, on the basis of the positions, the number, and the distribution state of the target portions, and the like. In displaying step S9, the controller 61 causes the display unit 64 to display the taken images obtained in image-taking step S7 and the result of the analysis obtained in analyzing step S8.

Embodiment 2

Figure 11:
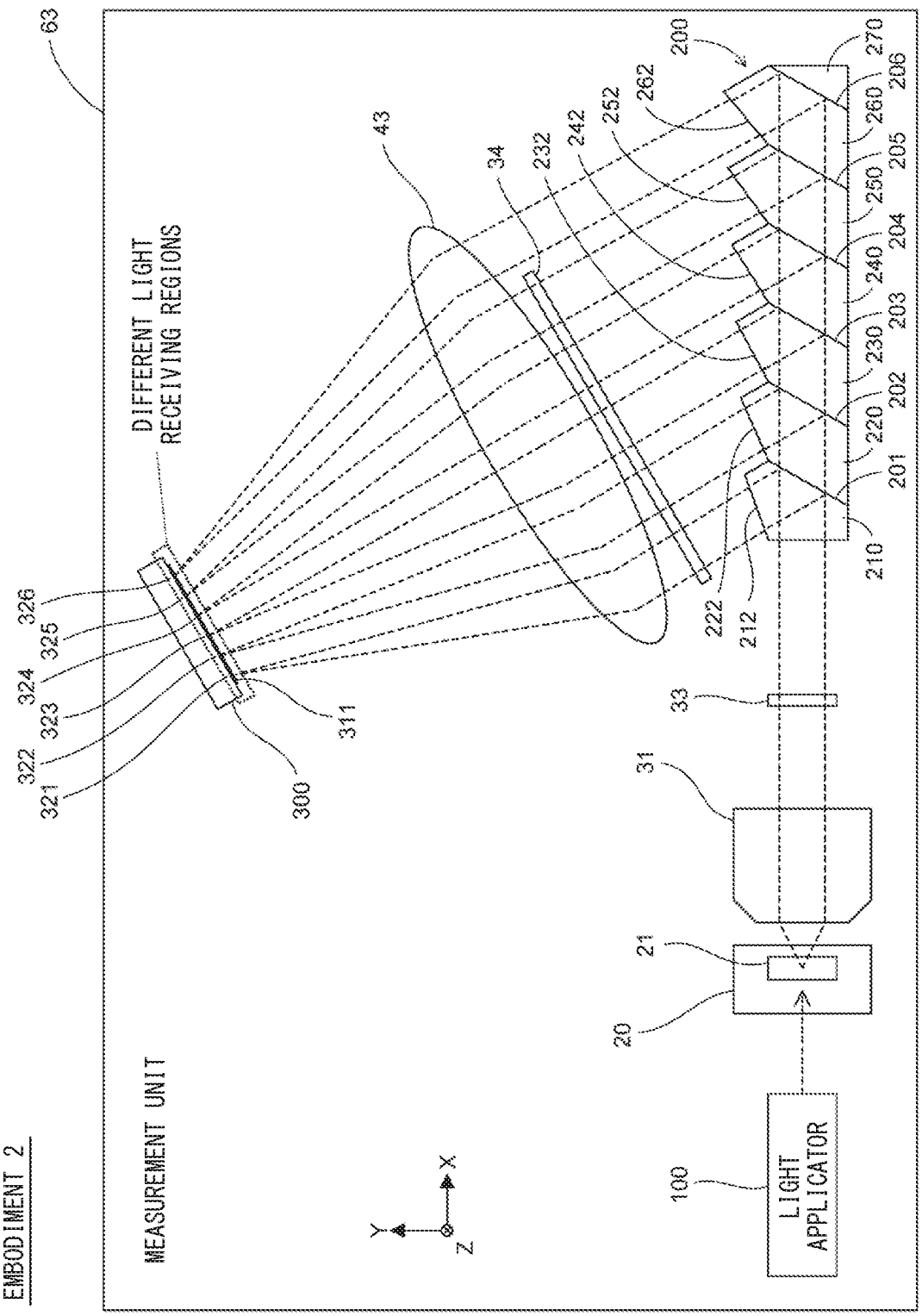
FIG. 11 is a schematic diagram showing a configuration of a measurement unit according to Embodiment 2.

FIG. 11 is a schematic diagram showing a configuration of a measurement unit 63 according to Embodiment 2.

The measurement unit 63 in Embodiment 2 is different from the measurement unit 63 in Embodiment 1 shown in FIG. 1 in that the first lens 41, the second lens 42, and the diaphragm 32 are omitted. In addition, the optical block 200, the filter 34, and the third lens 43 in Embodiment 2 are formed so as to be larger than those in Embodiment 1. The other components in Embodiment 2 have the same configurations as those of the sample measurement device 10 in Embodiment 1.

In Embodiment 2, since the reduction optical system 400 composed of the first lens 41 and the second lens 42 is omitted, the collimated light obtained through the collection and the conversion by the objective lens 31 is guided to the optical block 200 without being reduced in beam size.

Therefore, as shown in FIG. 11, the optical block 200 needs to be made larger than that in Embodiment 1. If the beam size of the light that enters the optical block 200 is made large, the lights having the respective wavelengths and reflected by the plurality of the reflection surfaces 201 to 206 come to easily overlap with one another. Therefore, it is necessary to increase the intervals between the plurality of the reflection surfaces 201 to 206, i.e., the distances d2 shown in FIG. 4. Accordingly, the optical block 200 in Embodiment 2 becomes larger than that in Embodiment 1. In addition, if the distances d2 in the optical block 200 are made long, the filter 34 and the third lens 43 also need to be made large.

As described above, also in Embodiment 2, the common optical block 200 is used for the lights having the plurality of wavelengths, and thus there is no need to use individual dichroic mirrors or the like for respectively guiding the lights having the respective wavelengths to the different light receiving regions 321 to 326, as in Embodiment 1. Accordingly, it becomes unnecessary to individually make any adjustments such as optical-axis alignment for a plurality of optical components, for the plurality of wavelengths. Therefore, operational burden can be lessened at the time of assembly and at the time of maintenance of the sample measurement device 10. On the other hand, in Embodiment 2, since the reduction optical system 400 is omitted, the sample measurement device 10 has a larger size than that in Embodiment 1. Therefore, Embodiment 1 is preferable from the viewpoint of downsizing the sample measurement device 10.

Embodiment 3

Figure 12:
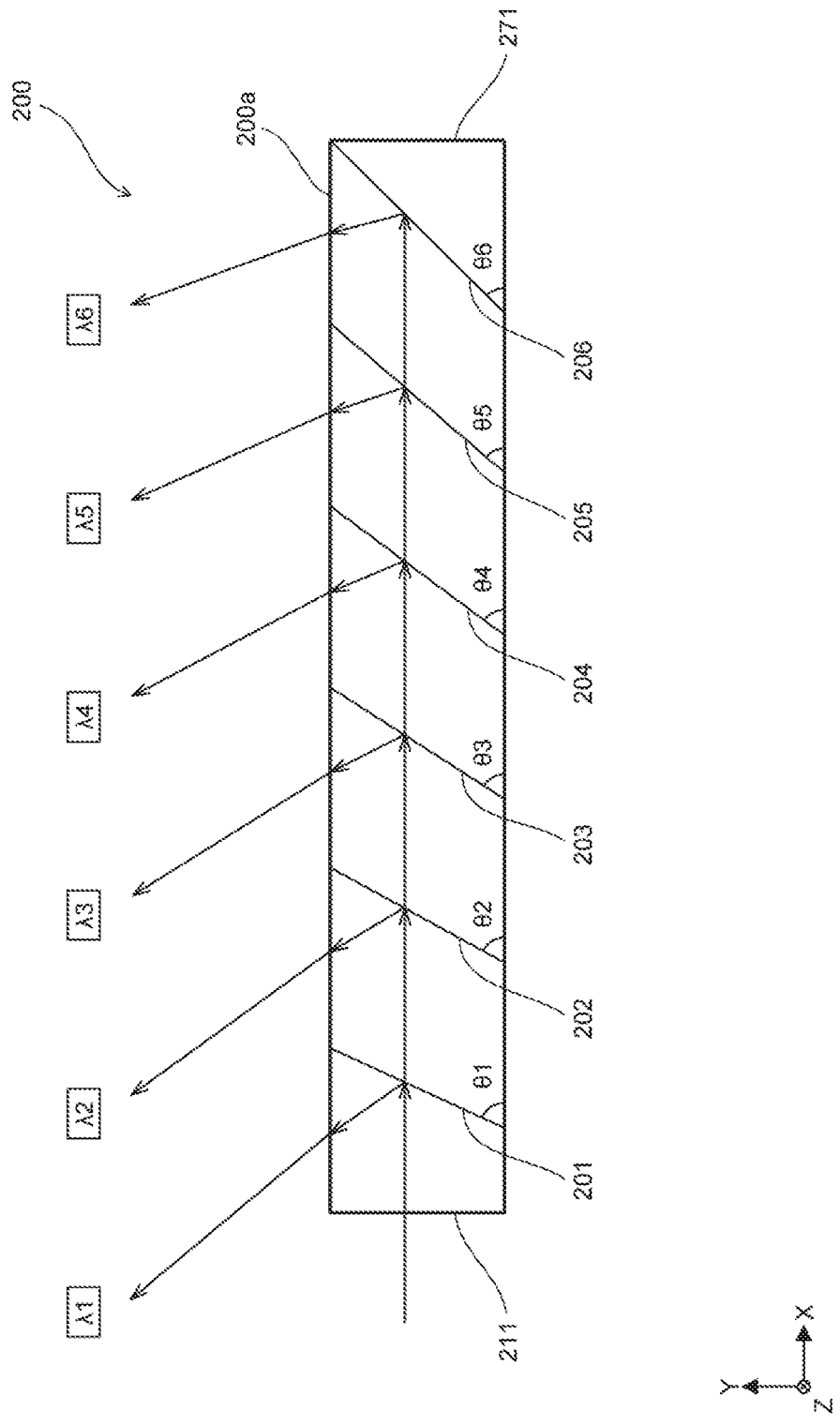
FIG. 12 is a schematic diagram showing a configuration of prisms according to Embodiment 3.

FIG. 12 is a schematic diagram showing a configuration of an optical block 200 according to Embodiment 3. Components in Embodiment 3 other than the optical block 200 have the same configurations as those of the sample measurement device 10 in Embodiment 1.

In Embodiment 3, the angles θ1, θ2, θ3, θ4, θ5, and θ6 of the tilts of the plurality of the reflection surfaces 201 to 206 are different from one another. The plurality of the reflection surfaces 201 to 206 are tilted in the same direction with respect to the advancement direction of the light that enters the optical block 200, as in Embodiment 1. In Embodiment 1, the advancement directions of the lights having the plurality of wavelengths λ1, λ2, λ3, λ4, λ5, and λ6 are changed so as to be different from one another by the plurality of the light outputting surfaces. However, in Embodiment 3, these advancement directions are changed so as to be different from one another according to the angles of the tilts of the plurality of the reflection surfaces 201 to 206.

The optical block 200 in Embodiment 3 has, on the Y-axis positive side thereof, a single light outputting surface 200a parallel to an X-Z plane. The lights reflected by the plurality of the reflection surfaces 201 to 206 are refracted by the light outputting surface 200a and outputted from the light outputting surface 200a. Here, the angles of refraction of the lights having the respective wavelengths by the light outputting surface 200a vary according to the wavelengths. Thus, in adjustment of the advancement directions of lights to be outputted from the light outputting surface 200a, the refraction by the light outputting surface 200a also needs to be taken into consideration.

In Embodiment 3, the advancement directions of the lights having the respective wavelengths to be outputted from the light outputting surface 200a are determined through adjustment of the angles of the tilts of the plurality of the reflection surfaces 201 to 206 while the angles of refraction of the lights having the respective wavelengths by the light outputting surface 200a are taken into consideration. Also in this case, the lights having the respective wavelengths and reflected by the optical block 200 can be applied to the desired light receiving regions, as in Embodiment 1. Thus, also in Embodiment 3, since the common optical block 200 shown in FIG. 12 is used for the lights having the plurality of wavelengths, there is no need to use individual dichroic mirrors or the like for respectively guiding the lights having the respective wavelengths to the different light receiving regions 321 to 326, as in Embodiment 1. Accordingly, it becomes unnecessary to individually make any adjustments such as optical-axis alignment for a plurality of optical components, for the plurality of wavelengths. Therefore, operational burden can be lessened at the time of assembly and at the time of maintenance of the sample measurement device 10.

Embodiment 4

Figure 13:
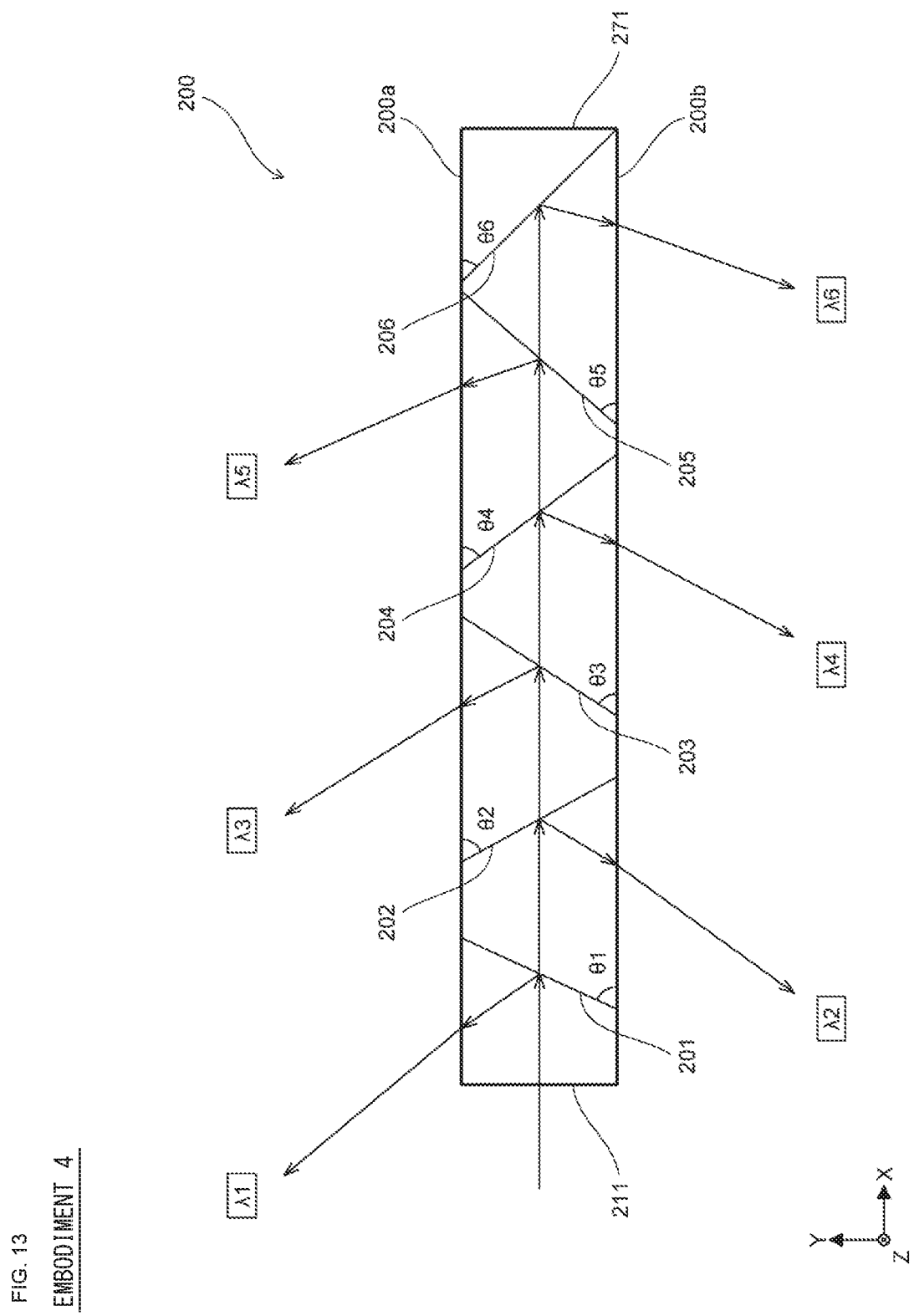
FIG. 13 is a schematic diagram showing a configuration of prisms according to Embodiment 4.

FIG. 13 is a schematic diagram showing a configuration of an optical block 200 according to Embodiment 4.

In the optical block 200 in Embodiment 4, the tilting directions of the reflection surfaces 202, 204, and 206 are different from those in the optical block 200 in Embodiment 3 shown in FIG. 12. In Embodiment 4, the reflection surfaces 201, 203, and 205 reflect lights to the Y-axis positive side as in Embodiment 3, but the reflection surfaces 202, 204, and 206 reflect lights to the Y-axis negative side. In other words, the three reflection surfaces 201, 203, and 205 belonging to a first group among the plurality of the reflection surfaces are tilted in the Y-axis positive direction with respect to the advancement direction of the light that enters the optical block 200, and the three reflection surfaces 202, 204, and 206 belonging to a second group different from the first group among the plurality of the reflection surfaces are tilted in the Y-axis negative direction with respect to the advancement direction of the light that enters the optical block 200.

In addition, the optical block 200 in Embodiment 4 is different from the optical block 200 in Embodiment 3 shown in FIG. 12 in that a single light outputting surface 200b parallel to the X-Z plane is provided on the Y-axis negative side of the optical block 200. The lights reflected by the three reflection surfaces 201, 203, and 205 belonging to the first group are refracted by the light outputting surface 200a and outputted from the light outputting surface 200a. Meanwhile, the lights reflected by the three reflection surfaces 202, 204, and 206 belonging to the second group are refracted by the light outputting surface 200b and outputted from the light outputting surface 200b.

Figure 14:
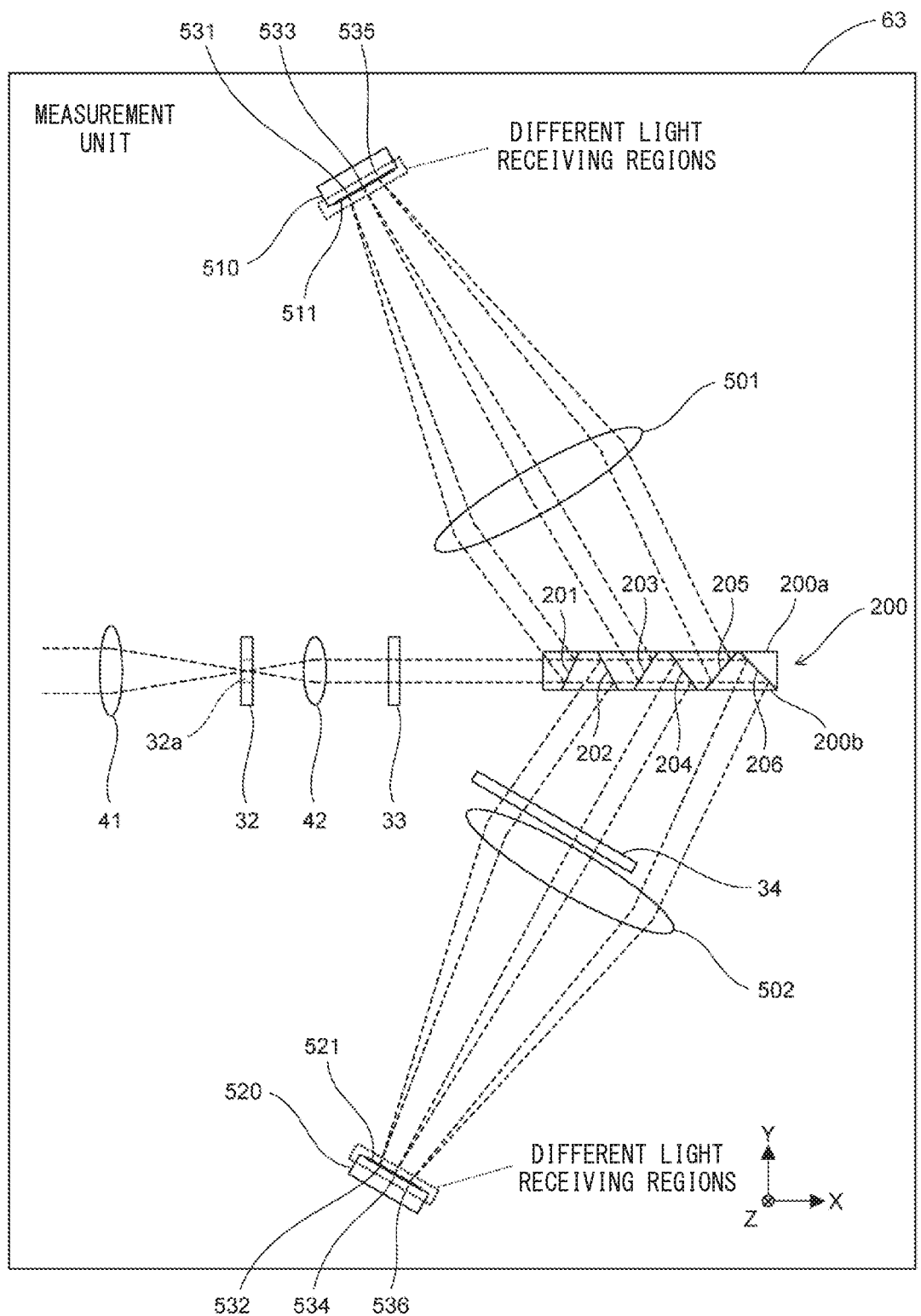
FIG. 14 is a schematic diagram showing a configuration of a measurement unit according to Embodiment 4.

FIG. 14 is a schematic diagram showing a configuration of a measurement unit 63 according to Embodiment 4. FIG. 14 does not show, for convenience, components located on the X-axis negative side relative to the first lens 41. Components in Embodiment 4 other than the measurement unit 63 have the same configurations as those of the sample measurement device 10 in Embodiment 1.

The measurement unit 63 in Embodiment 4 is different from that in Embodiment 1 in that two third lenses 501 and 502 and two light receivers 510 and 520 are provided therein instead of the third lens 43 and the light receiver 300. The third lens 501 and the light receiver 510 are disposed on the Y-axis positive side of the optical block 200 as in Embodiment 1, but the third lens 502 and the light receiver 520 are disposed on the Y-axis negative side of the optical block 200. The lights having the three wavelengths λ1, λ3, and λ5 and reflected toward the Y-axis positive side are condensed by the third lens 501 and received in light receiving regions 531, 533, and 535 different from one another on a light receiving surface 511 of the light receiver 510. Meanwhile, the lights having the three wavelengths λ2, λ4, and λ6 and reflected toward the Y-axis negative side are condensed by the third lens 502 and received in light receiving regions 532, 534, and 536 different from one another on a light receiving surface 521 of the light receiver 520.

The filter 34 is disposed between the optical block 200 and the third lens 502. In this case, the transmission wavelengths for the filter 34 are set such that the lights having the two wavelengths λ2 and λ4 are transmitted through the filter 34, and light having a wavelength other than the two wavelengths λ2 and λ4 is blocked by the filter 34. The filter 34 is located off the position through which the light having the wavelength λ6 passes toward the light receiving surface 521 of the light receiver 520.

Also in Embodiment 4, since the common optical block 200 is used for the lights having the plurality of wavelengths as shown in FIGS. 13 and 14, there is no need to use individual dichroic mirrors or the like for respectively guiding the lights having the respective wavelengths to the different light receiving regions 531 to 536, as in Embodiment 3. Accordingly, it becomes unnecessary to individually make any adjustments such as optical-axis alignment for a plurality of optical components, for the plurality of wavelengths. Therefore, operational burden can be lessened at the time of assembly and at the time of maintenance of the sample measurement device 10.

Alternatively, in the optical block 200 in Embodiment 1, the tilting directions of the plurality of the reflection surfaces 202, 204, and 206 may be changed such that the plurality of the reflection surfaces 202, 204, and 206 reflect lights toward the Y-axis negative side. In this case, the plurality of the light outputting surfaces 222, 242, and 262 corresponding to the plurality of the reflection surfaces 202, 204, and 206 are provided on the Y-axis negative side of the optical block 200.

Embodiment 5

Figure 15:
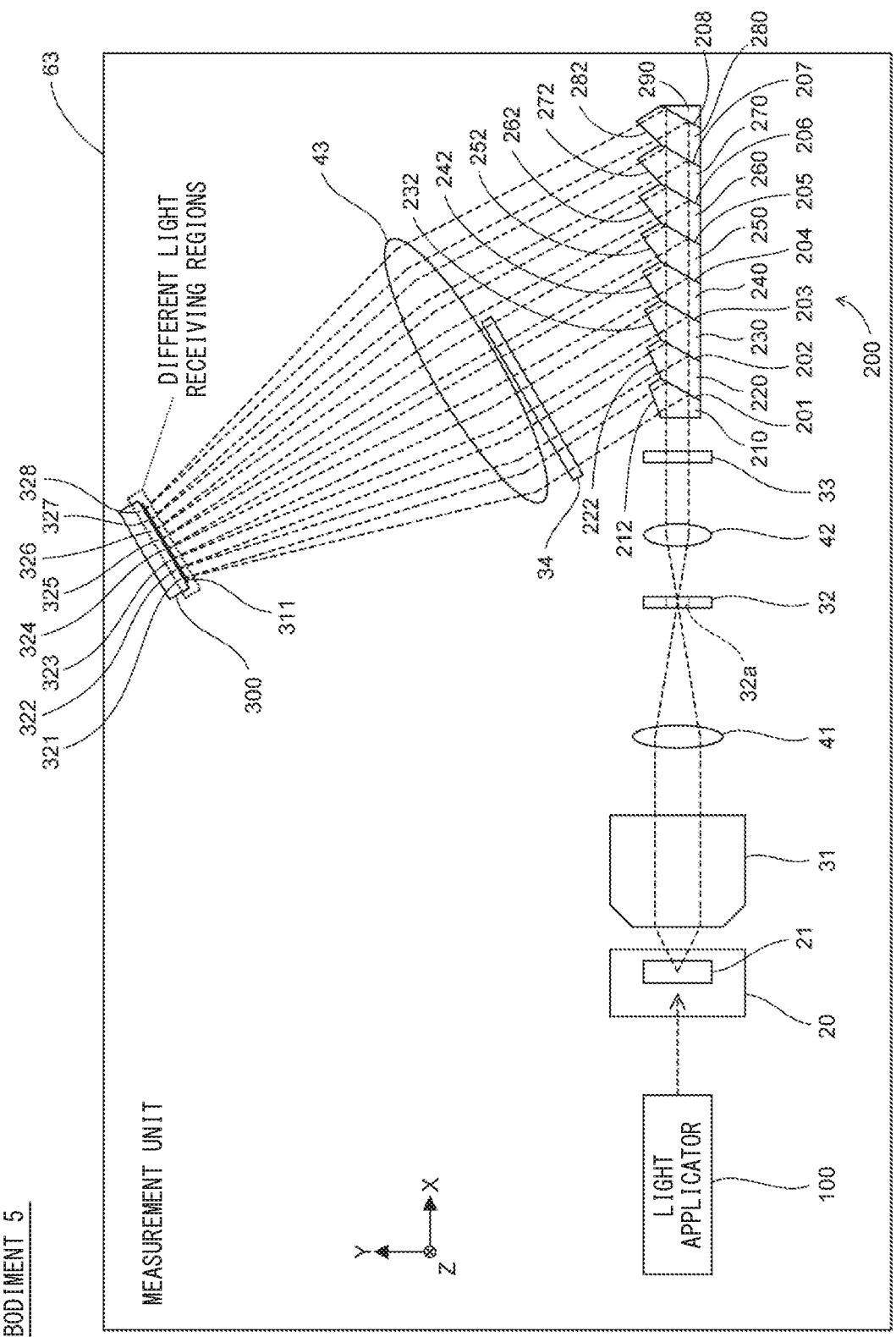
FIG. 15 is a schematic diagram showing a configuration of a measurement unit according to Embodiment 5.
Figure 16:
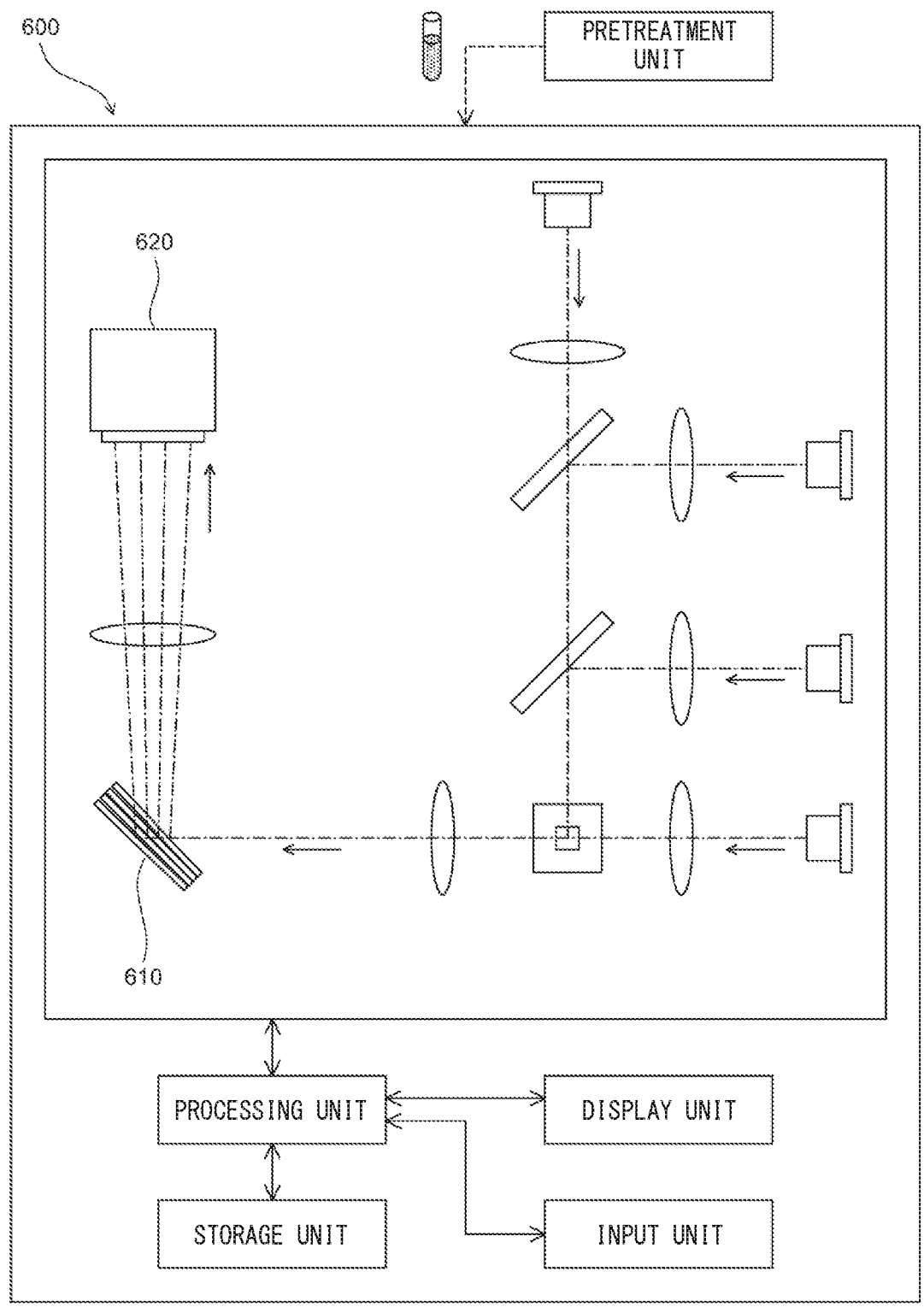
FIG. 16 is a schematic diagram for describing a configuration according to a related art.
Figure 17:
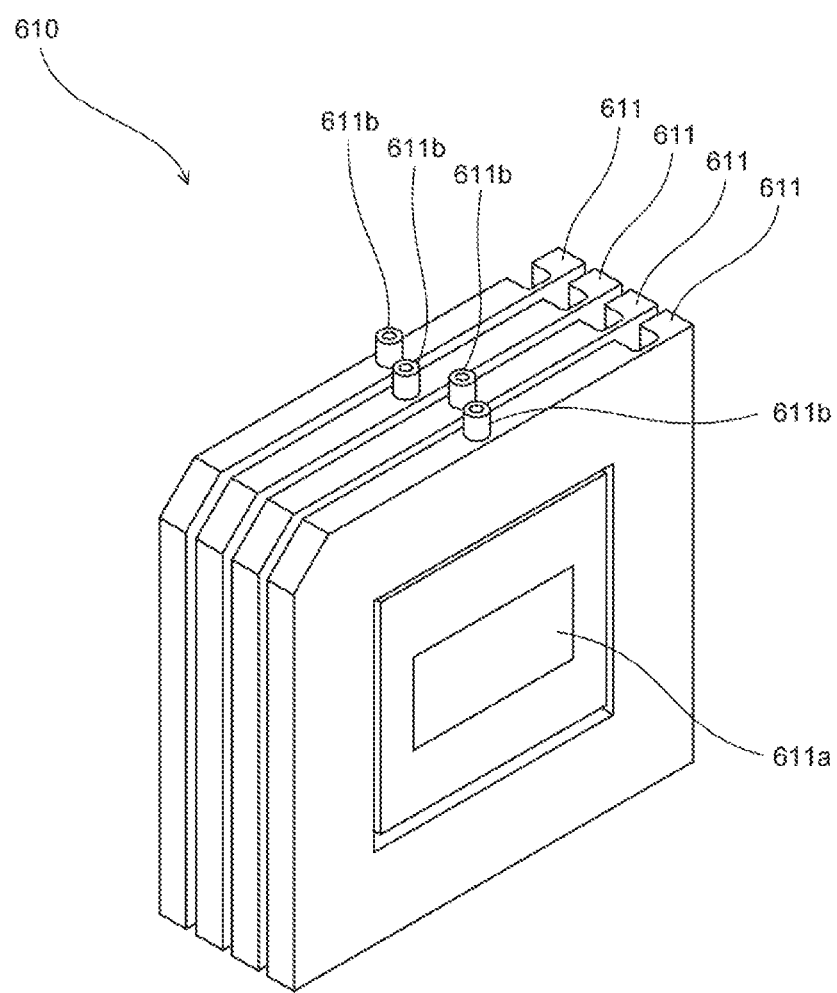
FIG. 17 is a schematic diagram for describing the configuration according to the related art.

FIG. 15 is a schematic diagram showing a configuration of a measurement unit 63 according to Embodiment 5.

In Embodiment 5, the light having the wavelength λ11 and emitted from the light source 101 (see FIG. 3) of the light applicator 100 is linearly polarized light, and the light source 101 is disposed in the device such that the polarization direction of the linearly polarized light is aligned with a predetermined direction. The polarization direction when the light from the light source 101 is applied to a sample, is referred to as an "initial polarization direction". When the light having the wavelength λ11 is applied to particles in the sample, scattered light is generated in the X-axis positive direction from the particles. The polarization direction of the scattered light generated from the particles is changed from the initial polarization direction according to the optical rotation properties of components contained in the particles.

In Embodiment 5, as described with reference to FIG. 3, the light emitted from the light source 101 is applied in the Y-axis positive direction to the sample, and the objective lens 31 is disposed on the X-axis positive direction side of the flow path 21. Therefore, scattered light collected by the objective lens 31 and guided via the optical block 200 to the light receiver 300, is side scattered light generated from the particles.

The filter 33 in Embodiment 5 is configured such that the light having the wavelength λ11 is transmitted therethrough. Accordingly, the scattered light generated from the sample and having the wavelength λ11 is transmitted through the filter 33 and enters the optical block 200.

The plurality of the reflection surfaces 201 to 206 in Embodiment 5 are different from those in Embodiment 1 in being configured such that the light having the wavelength λ11 is also transmitted through the plurality of the reflection surfaces. The optical block 200 in Embodiment 5 is different from that in Embodiment 1 in that a seventh reflection surface and an eighth reflection surface are further provided on the X-axis positive side of the reflection surface 206. Hereinafter, the seventh reflection surface and the eighth reflection surface are respectively referred to as a reflection surface 207 and a reflection surface 208. The optical block 200 in Embodiment 5 further includes an eighth prism and a ninth prism. Hereinafter, the eighth prism and the ninth prism are respectively referred to as a prism 280 and a prism 290. The prisms 270 and 280 in Embodiment 5 have the same shapes as those of the prisms 220, 230, 240, 250, and 260 in Embodiment 1. The prism 290 in Embodiment 5 has the same shape as that of the prism 270 in Embodiment 1.

A polarizing coating is applied on a slope, of the prism 280 before assembly, that corresponds to the reflection surface 207 so that a polarizing filter is formed on the slope, whereby the reflection surface 207 is formed. The reflection surface 207 reflects a light having a first polarization direction, and allows transmission therethrough of a light having a second polarization direction different from the first polarization direction. Specifically, the reflection surface 207 reflects a scattered light having the wavelength λ11 and having a polarization direction that matches the initial polarization direction, and allows transmission therethrough of a scattered light having the wavelength λ11 and having a polarization direction that does not match the initial polarization direction. A coating for totally reflecting light is applied on a slope, of the prism 290 before assembly, that corresponds to the reflection surface 208 so that a totally-reflecting mirror is formed on the slope, whereby the reflection surface 208 is formed. Joining of the prism 270 and the prism 280, and joining of the prism 280 and the prism 290, are performed in the same manner as the joining of the prisms in Embodiment 1.

The advancement direction of a scattered light which has been reflected by the reflection surface 207 and which has the wavelength λ11 and has the polarization direction that matches the initial polarization direction, is changed by a light outputting surface 272 located on the Y-axis positive side of the reflection surface 207. The advancement direction of a scattered light which has been reflected by the reflection surface 208 and which has the wavelength λ11 and has the polarization direction that does not match the initial polarization direction, is changed by a light outputting surface 282 located on the Y-axis positive side of the reflection surface 208.

Accordingly, the lights reflected by the plurality of the reflection surfaces 201 to 208 are applied to the respective different light receiving regions 321, 322, 323, 324, 325, 326, 327, and 328 on the light receiving surface 311 of the light receiver 300. The scattered light having the wavelength λ11 and having the polarization direction that matches the initial polarization direction is guided to the light receiving region 327, and the scattered light having the wavelength λ11 and having the polarization direction that does not match the initial polarization direction is guided to the light receiving region 328. Accordingly, taken images based on the lights reflected by the plurality of the reflection surfaces 207 and 208 can also be obtained in addition to the taken images based on the lights reflected by the plurality of the reflection surfaces 201 to 206. Referring to the taken images based on the lights reflected by the plurality of the reflection surfaces 207 and 208, the optical rotation properties of the components contained in the particles to be measured are determined, whereby the particles to be measured can be analyzed.

In Embodiment 5, when the scattered light having the initial polarization direction and the scattered light having the polarization direction that does not match the initial polarization direction are generated from the particles in the sample, these scattered lights are reflected by the plurality of the reflection surfaces 207 and 208 provided to the optical block 200 and are guided to the different light receiving regions 327 and 328 of the light receiver 300, respectively. Therefore, since the common optical block 200 shown in FIG. 15 is used for the lights having different polarization directions, there is no need to use individual polarizing filters or the like for respectively guiding the lights having the different polarization directions to the different light receiving regions 327 and 328. Since the optical block 200 in which the plurality of the reflection surfaces 207 and 208 have been formed integrally with each other is provided, the angles formed between the respective reflection surfaces are fixed. Accordingly, it becomes unnecessary to individually make any adjustments such as optical-axis alignment for a plurality of optical components, for the respective lights having the different polarization directions. Therefore, operational burden can be lessened at the time of assembly and at the time of maintenance of the sample measurement device 10.

In Embodiment 5, as for the same measurement operations as those by the sample measurement device 10 according to Embodiment 1 shown in FIG. 10, analysis and display are performed on the basis of the scattered lights having the wavelength λ11 and generated from the particles in the sample. Hereinafter, measurement operations different from those in Embodiment 1 will be described with reference to FIG. 10.

In Embodiment 5, in step S3 of causing light to enter the optical block, the objective lens 31, the first lens 41, the second lens 42, and the filter 33 allow entry, into the optical block 200, of scattered lights having the wavelength λ11 and generated from the particles in the sample to which the application light has been applied.

In step S4 of reflecting lights, the optical block 200 allows the lights having entered the optical block 200 and having different polarization directions to be selectively reflected by the two reflection surfaces 207 and 208. In step S5 of refracting the lights, the optical block 200 allows the lights reflected by the two reflection surfaces 207 and 208 and having the different polarization directions to be respectively refracted by the two light outputting surfaces 272 and 282. In step S6 of guiding the lights to the light receiving regions, the lights outputted from the two light outputting surfaces 272 and 282 are respectively guided to the two corresponding light receiving regions 327 and 328.

In image-taking step S7, the light receiver 300 generates taken images that correspond to the two types of scattered lights having the different polarization directions and received in the two different light receiving regions 327 and 328. In analyzing step S8, the controller 61 determines the optical rotation properties of the components contained in the particles on the basis of the taken images obtained in image-taking step S7, and analyzes the particles to be measured, on the basis of the determined optical rotation properties. In displaying step S9, the controller 61 causes the display unit 64 to display the taken images obtained in image-taking step S7 and the result of the analysis obtained in analyzing step S8.

In the configuration shown in FIG. 15, in a case where only scattered light is analyzed, an optical block 200 provided only with the plurality of the reflection surfaces 207 and 208 and the plurality of the light outputting surfaces 272 and 282 may be used. In addition, the reflection surface 207 may allow transmission therethrough of the scattered light having the wavelength λ11 and having the polarization direction that matches the initial polarization direction, and may reflect the scattered light having the wavelength λ11 and having the polarization direction that does not match the initial polarization direction. In addition, the lights having the different polarization directions and guided to the plurality of light receiving regions 327 and 328 by the optical block 200 are not limited to side scattered lights, and may be forward scattered lights or fluorescences.

What is claimed is:

1. A sample measurement device comprising:
a light applicator configured to apply a light to a sample so as to generate light from a particle in the sample;
an optical block comprising a plurality of prisms joined together, each of the plurality of prisms including:
a light entry surface which allows entry thereinto of the light generated from the particle in the sample,
a reflection surface configured to selectively reflect a part of the light having entered the light entry surface, and
a light outputting surface configured to output the light reflected by the reflection surface; and
a light receiver configured to receive the light outputted from the light outputting surface of each of the plurality of prisms,
wherein the reflection surfaces of the plurality of prisms are arranged along an advancement direction of the light that enters the optical block,
the reflection surfaces of the plurality of prisms are tilted in a same direction with respect to an advancement direction of the light that enters the optical block, and
the light outputting surfaces of the plurality of prisms are tilted at different angles with respect to an advancement direction of the light that enters the optical block.

2. The sample measurement device of claim 1, wherein the plurality of prisms are formed integrally with each other.

3. The sample measurement device of claim 1, wherein
a first group of reflection surface among the reflection surfaces of the plurality of prisms is tilted in a first direction with respect to an advancement direction of the light that enters the optical block, and
a second group of reflection surface different from the first group, among the reflection surfaces of the plurality of prisms, is tilted in a second direction different from the first direction, with respect to the advancement direction of the light that enters the optical block.

4. The sample measurement device of claim 1, wherein the reflection surfaces of the plurality of prisms are arranged at intervals, each interval preventing the light reflected by each of the reflection surfaces from entering a light outputting surface that is adjacent to a corresponding light outputting surface.

5. The sample measurement device of claim 1, wherein the plurality of prisms are each formed of translucent glass or resin.

6. The sample measurement device of claim 1, wherein the plurality of prisms include at least a first prism and a second prism,
the first prism includes:
   a first light entry surface,
   a first reflection surface configured to selectively reflect a light with a first wavelength among light having entered the first light entry surface, the first reflection surface being configured to allow transmission therethrough of a light with a wavelength other than the first wavelength, and
   a first light outputting surface configured to output the light reflected by the first reflection surface, and
the second prism includes:
   a second light entry surface configured to allow entry thereinto of the light transmitted through the first reflection surface,
   a second reflection surface configured to selectively reflect a light with a second wavelength different from the first wavelength among the light having entered the second light entry surface, the second reflection surface being configured to allow transmission therethrough of a light with a wavelength other than the second wavelength, and
   a second light outputting surface configured to output the light reflected by the second reflection surface.

7. The sample measurement device of claim 1, wherein the reflection surfaces of the plurality of prisms include a reflection surface configured to reflect a light having a predetermined polarization direction.

8. The sample measurement device of claim 1, wherein the light receiver is configured to receive, on a single light receiving surface thereof, the lights reflected by the reflection surfaces of the plurality of prisms.

9. The sample measurement device of claim 1, wherein the light receiver comprises a first light receiver and a second light receiver,
the first light receiver is configured to receive, on a first light receiving surface thereof, a light reflected by a reflection surface belonging to a first group among the plurality of the reflection surfaces of the plurality of prisms, and
the second light receiver is configured to receive, on a second light receiving surface thereof which is different from the first light receiving surface, a light reflected by a reflection surface belonging to a second group different from the first group among the plurality of the reflection surfaces of the plurality of prisms.

10. The sample measurement device of claim 1, further comprising
a reduction optical system configured to reduce and collimate a shape of the light generated from the particle in the sample to guide the light to the optical block.

11. The sample measurement device of claim 10, wherein the reduction optical system comprises: a first lens configured to condense the light generated from the particle in the sample; and a second lens configured to collimate the light condensed by the first lens to guide the collimated light to the optical block.

12. The sample measurement device of claim 11, wherein the first lens and the second lens are each a convex lens.

13. The sample measurement device of claim 1, further comprising
an objective lens configured to collect the light generated from the particle in the sample.

14. The sample measurement device of claim 1, wherein the light receiver is configured to take a bright field image and a fluorescence image of the particle, in respective different light receiving regions of the light receiver.

15. The sample measurement device of claim 14, wherein the reflection surface that is disposed at an end among the reflection surfaces of the plurality of prisms is arranged to reflect a light for the bright field image.

16. The sample measurement device of claim 1, wherein the light receiver is configured to take a bright field image and a fluorescence image of the particle, in respective different light receiving regions of the light receiver, and
the sample measurement device further comprises a filter disposed between the optical block and the light receiver and configured to block a light for the bright field image, at a position through which a light for the fluorescence image passes.

17. A sample measurement method comprising:
applying a light to a sample;
causing light generated from a particle in the sample to enter an optical block in comprising a plurality of prisms joined together, each of the plurality of prisms including:
   a light entry surface which allows entry thereinto of the light generated from the particle in the sample,
   a reflection surface configured to selectively reflect a part of the light having entered the light entry surface, and
   a light outputting surface configured to output the light reflected by the reflection surface; and
guiding the light outputted from the light outputting surface of each of the plurality of prisms to a light receiving region,
wherein the reflection surfaces of the plurality of prisms are arranged along an advancement direction of the light that enters the optical block,
the reflection surfaces of the plurality of prisms are tilted in a same direction with respect to an advancement direction of the light that enters the optical block, and
the light outputting surfaces of the plurality of prisms are tilted at different angles with respect to an advancement direction of the light that enters the optical block.

* * * * *